(12) United States Patent
Gass

(10) Patent No.: US 8,196,499 B2
(45) Date of Patent: *****Jun. 12, 2012

(54) POWER EQUIPMENT WITH DETECTION AND REACTION SYSTEMS

(75) Inventor: Stephen F. Gass, West Linn, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,836

(22) Filed: Aug. 20, 2010

(65) Prior Publication Data

US 2011/0023673 A1  Feb. 3, 2011

Related U.S. Application Data

(63) Continuation of application No. 11/796,819, filed on Apr. 30, 2007, which is a continuation of application No. 09/929,426, filed on Aug. 13, 2001, now Pat. No. 7,210,383, application No. 12/806,836, which is acontinuation of application No. 12/655,695, filed on Jan. 4, 2010, which is a continuation of application No. 11/975,985, filed on Oct. 22, 2007, now Pat. No. 7,640,835, which is a continuation of application No. 09/929,221, filed on Aug. 13, 2001, now Pat. No. 7,284,467, application No. 12/806,836, which is a (Continued)

(51) Int. Cl.
*B26D 5/00* (2006.01)

(52) U.S. Cl. .................. 83/62.1; 83/522.12; 83/DIG. 1; 192/129 R

(58) Field of Classification Search ............... 83/DIG. 1, 83/58, 62, 62.1, 72, 76.7, 788, 581, 471.2, 83/477.1, 477.2, 522.12, 526, 397.1, 522.121; 144/154.5, 356, 384, 391, 427, 286.5; 29/708, 254, 413; 324/550, 424; 408/5; 56/10.9, 11.3; 192/192 A, 129 R, 130; 102/202.7; 89/1.56; 137/68.12, 72, 76; 188/5, 6, 110, 189; 169/57, 59, 42, DIG. 3; 74/2; 403/2, 28; 411/2, 39, 390; 335/1, 242, 132; 318/362; 241/32.5; 337/239, 148, 1, 5, 10, 17, 140, 170, 190, 237, 401, 290, 404, 405; 218/2, 154; 307/639, 328, 115, 326, 142, 117, 126, 131; 451/409; 280/806; 297/480; 187/69, 77, 89, 189, 216, 166, 72.3
See application file for complete search history.

(56) References Cited

U.S. PATENT DOCUMENTS 146,886 A  1/1874  Doane et al.
(Continued)

FOREIGN PATENT DOCUMENTS

CA  2140991  1/1995
(Continued)

OTHER PUBLICATIONS

Sink Drain Plug Lifter, circa 1974.
(Continued)

*Primary Examiner* — Jason Daniel Prone

(57) ABSTRACT

Woodworking machines and safety methods for use with those machines are disclosed. The machines include a detection system adapted to detect one or more dangerous conditions and a reaction system associated with the detection system. The reaction system can include an explosive to trigger the system, and also can be configured to retract a cutting tool at least partially away from a cutting region upon detection of a dangerous condition by the detection system.

8 Claims, 16 Drawing Sheets

Related U.S. Application Data continuation of application No. 12/002,388, filed on Dec. 17, 2007, which is a continuation of application No. 09/929,227, filed on Aug. 13, 2001, now Pat. No. 7,308,843, application No. 12/806,836, which is a continuation of application No. 11/401,050, filed on Apr. 10, 2006, now Pat. No. 7,788,999, which is a continuation of application No. 09/929,240, filed on Aug. 13, 2001, now Pat. No. 7,100,483, which is a continuation of application No. 09/929,241, filed on Aug. 13, 2001, now Pat. No. 7,024,975, which is a continuation of application No. 09/929,425, filed on Aug. 13, 2001, now Pat. No. 7,137,326, which is a continuation of application No. 10/172,553, filed on Jun. 13, 2002, now Pat. No. 7,231,856, which is a continuation of application No. 10/189,027, filed on Jul. 2, 2002, now Pat. No. 7,712,403, which is a continuation of application No. 10/243,042, filed on Sep. 13, 2002, now Pat. No. 7,197,969, which is a continuation of application No. 10/643,296, filed on Aug. 18, 2003, now abandoned, which is a continuation of application No. 10/794,161, filed on Mar. 4, 2004, now Pat. No. 7,098,800, application No. 12/806,836, which is a continuation of application No. 12/800,607, filed on May 19, 2010, now Pat. No. 7,895,927, which is a continuation of application No. 11/542,938, filed on Oct. 2, 2006, now abandoned, which is a continuation of application No. 10/984,643, filed on Nov. 8, 2004, which is a continuation of application No. 09/929,226, filed on Aug. 13, 2001, now Pat. No. 6,920,814, which is a continuation of application No. 09/929,240, filed on Aug. 13, 2001, now Pat. No. 7,100,483, which is a continuation of application No. 09/929,242, filed on Aug. 13, 2001, now Pat. No. 7,509,899, which is a continuation of application No. 10/051,782, filed on Jan. 15, 2002, now Pat. No. 6,877,410, which is a continuation of application No. 10/052,806, filed on Jan. 16, 2002, now Pat. No. 6,880,440, which is a continuation of application No. 10/205,164, filed on Jul. 25, 2002, now Pat. No. 6,945,149, which is a continuation of application No. 10/202,928, filed on Jul. 25, 2002, now Pat. No. 7,000,514, which is a continuation of application No. 10/785,361, filed on Feb. 23, 2004, now Pat. No. 6,997,090, which is a continuation of application No. 10/215,929, filed on Aug. 9, 2002, now abandoned, application No. 12/806,836, which is a continuation of application No. 11/542,938, filed on Oct. 2, 2006, now abandoned, which is a continuation of application No. 09/929,242, filed on Aug. 13, 2001, now Pat. No. 7,509,899, which is a continuation of application No. 11/401,774, filed on Apr. 11, 2006, now Pat. No. 7,525,055, which is a continuation of application No. 11/027,322, filed on Dec. 31, 2004, now abandoned, which is a continuation of application No. 11/445,548, filed on Jun. 2, 2006, now Pat. No. 7,347,131, which is a continuation of application No. 11/506,260, filed on Aug. 18, 2006, now Pat. No. 7,359,174, which is a continuation of application No. 10/923,282, filed on Aug. 20, 2004, now abandoned, application No. 12/806,836, which is a continuation of application No. 12/590,094, filed on Nov. 2, 2009, now Pat. No. 7,958,806, which is a continuation of application No. 09/929,236, filed on Aug. 13, 2001, now Pat. No. 7,610,836, application No. 12/806,836, which is a continuation of application No. 11/811,719, filed on Jun. 11, 2007, now Pat. No. 7,832,314, which is a continuation of application No. 11/061,162, filed on Feb. 18, 2005, now Pat. No. 7,228,772, which is a continuation of application No. 09/929,244, filed on Aug. 13, 2001, now Pat. No. 6,857,345, application No. 12/806,836, which is a continuation of application No. 12/587,695, filed on Oct. 9, 2009, now Pat. No. 7,921,754, which is a continuation of application No. 09/929,237, filed on Aug. 13, 2001, now Pat. No. 7,600,455, application No. 12/806,836, which is a continuation of application No. 12/661,766, filed on Mar. 22, 2010, which is a continuation of application No. 11/810,196, filed on Jun. 4, 2007, now Pat. No. 7,681,479, which is a continuation of application No. 09/929,234, filed on Aug. 13, 2001, now Pat. No. 7,225,712, application No. 12/806,836, which is a continuation of application No. 12/655,694, filed on Jan. 4, 2010, now Pat. No. 7,908,950, which is a continuation of application No. 12/079,836, filed on Mar. 27, 2008, now Pat. No. 7,640,837, which is a continuation of application No. 09/929,235, filed on Aug. 13, 2001, now Pat. No. 7,350,444, application No. 12/806,836, which is a continuation of application No. 12/799,211, filed on Apr. 19, 2010, which is a continuation of application No. 12/220,946, filed on Jul. 29, 2008, now Pat. No. 7,698,976, which is a continuation of application No. 09/929,238, filed on Aug. 13, 2001, now abandoned, application No. 12/806,836, which is a continuation of application No. 12/590,924, filed on Nov. 16, 2009, which is a continuation of application No. 12/154,675, filed on May 23, 2008, now Pat. No. 7,617,752, which is a continuation of application No. 10/053,390, filed on Jan. 16, 2002, now Pat. No. 7,377,199, which is a continuation-in-part of application No. 09/676,190, filed on Sep. 29, 2000, now Pat. No. 7,055,417, which is a continuation-in-part of application No. 10/053,390, application No. 12/806,836, which is a continuation of application No. 12/313,162, filed on Nov. 17, 2008, now Pat. No. 7,789,002, which is a continuation of application No. 11/348,580, filed on Feb. 6, 2006, now abandoned, which is a continuation of application No. 10/052,705, filed on Jan. 16, 2002, now Pat. No. 6,994,004, said application No. 12/313,162 is a continuation of application No. 11/098,984, filed on Apr. 4, 2005, now Pat. No. 7,353,737, which is a continuation of application No. 09/929,238, filed on Aug. 13, 2001, now abandoned, which is a continuation of application No. 10/047,066, filed on Jan. 14, 2002, now Pat. No. 6,945,148, which is a continuation of application No. 10/051,782, filed on Jan. 15, 2002, now Pat. No. 6,877,410, application No. 12/806,836, which is a continuation of application No. 12/661,993, filed on Mar. 26, 2010, which is a continuation of application No. 11/982,972, filed on Nov. 5, 2007, now Pat. No. 7,685,912, which is a continuation of application No. 10/932,339, filed on Sep. 1, 2004, now Pat. No. 7,290,472, which is a continuation of application No. 10/047,066, filed on Jan. 14, 2002, now Pat. No. 6,945,148, said application No. 10/932,339 is a continuation of application No. 10/050,085, filed on Jan. 14, 2002, now abandoned, application No. 12/806,836, which is a continuation of application No. 10/100,211, filed on Mar. 13, 2002, application No. 12/806,836, which is a continuation of application No. 11/256,757, filed on Oct. 24, 2005, which is a continuation of application No. 09/955,418, filed on Sep. 17, 2001, now Pat. No. 6,957,601, application No. 12/806,836, which is a continuation of application No. 10/146,527, filed on May 15, 2002, application No. 12/806,836, which is a continuation of application No. 12/586,469, filed on Sep. 21, 2009, which is a continuation of application No. 11/702,330, filed on Feb. 5, 2007, now Pat. No. 7,591,210, which is a continuation of application No. 10/189,031, filed on Jul. 2, 2002, now Pat. No. 7,171,879, application No. 12/806,836, which is a continuation of application No. 11/208,214, filed on Aug. 19, 2005, now Pat. No. 7,784,507, which is a continuation of application No. 10/251,576, filed on Sep. 20, 2002, now abandoned, which is a continuation of application No. 10/197,975, filed on Jul. 18, 2002, now abandoned, said application No. 11/208,214 is a continuation of application No. 09/676,190, filed on Sep. 29, 2000, now Pat. No. 7,055,417, application No. 12/806,836, which is a continuation of application No. 12/231,080, filed on Aug. 29, 2008, now Pat. No. 7,900,541, which is a continuation of application No. 11/487,717, filed on Jul. 17, 2006, now Pat. No. 7,421,315, which is a continuation of application No. 10/292,607, filed on Nov. 12, 2002, now Pat. No. 7,077,039, application No. 12/806,836, which is a continuation of application No. 12/655,962, filed on Jan. 11, 2010, now abandoned, which is a continuation of application No. 12/313,277, filed on Nov. 17, 2008, now Pat. No. 7,644,645, which is a continuation of application No. 10/345,630, filed on Jan. 15, 2003, application No. 12/806,836, which is a continuation of application No. 12/658,759, filed on Feb. 12, 2010, now abandoned, which is a continuation of application No. 11/787,471, filed on Apr. 17, 2007, now Pat. No. 7,661,343, which is a continuation of application No. 10/341,260, filed on Jan. 13, 2003, now abandoned, application No. 12/806,836, which is a continuation of application No. 11/647,676, filed on Dec. 29, 2006, now Pat. No. 7,836,804, which is a continuation of application No. 10/923,290, filed on Aug. 20, 2004, now Pat. No. 7,472,634, application No. 12/806,836, which is a continuation of application No. 12/079,820, filed on Mar. 27, 2008, now Pat. No. 7,845,258, which is a continuation of application No. 10/923,273, filed on Aug. 20, 2004, now Pat. No. 7,350,445, application No. 12/806,836, which is a continuation of application No. 12/454,569, filed on May 18, 2009, which is a continuation of application No. 11/027,600, filed on Dec. 31, 2004, now Pat. No. 7,536,238, application No. 12/806,836, which is a continuation of application No. 12/799,915, filed on May 3, 2010, which is a continuation of application No. 12/322,069, filed on Jan. 26, 2009, now Pat. No. 7,707,918, which is a continuation of application No. 11/107,499, filed on Apr. 15, 2005, now Pat. No. 7,481,140, application No. 12/806,836, which is a continuation of application No. 12/077,576, filed on Mar. 19, 2008, now abandoned, which is a continuation of application No. 11/027,254, filed on Dec. 31, 2004, now abandoned, application No. 12/806,836, which is a continuation of application No. 12/799,920, filed on May 3, 2010, which is a continuation of application No. 11/026,114, filed on Dec. 31, 2004, now Pat. No. 7,707,920, application No. 12/806,836, which is a continuation of application No. 11/026,006, filed on Dec. 31, 2004, application No. 12/806,836, which is a continuation of application No. 11/045,972, filed on Jan. 28, 2005, now Pat. No. 7,827,890, application No. 12/806,836, which is a continuation of application No. 12/454,730, filed on May 20, 2009, which is a continuation of application No. 11/395,502, filed on Mar. 31, 2006.

(60) Provisional application No. 60/157,340, filed on Oct. 1, 1999, provisional application No. 60/182,866, filed on Feb. 16, 2000, provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000, provisional application No. 60/233,459, filed on Sep. 18, 2000, provisional application No. 60/270,011, filed on Feb. 20, 2001, provisional application No. 60/270,941, filed on Feb. 22, 2001, provisional application No. 60/270,942, filed on Feb. 22, 2001, provisional application No. 60/273,177, filed on Mar. 2, 2001, provisional application No. 60/273,178, filed on Mar. 2, 2001, provisional application No. 60/273,902, filed on Mar. 6, 2001, provisional application No. 60/275,583, filed on Mar. 13, 2001, provisional application No. 60/275,594, filed on Mar. 13, 2001, provisional application No. 60/275,595, filed on Mar. 13, 2001, provisional application No. 60/279,313, filed on Mar. 27, 2001, provisional application No. 60/292,081, filed on May 17, 2001, provisional application No. 60/292,100, filed on May 17, 2001, provisional application No. 60/298,207, filed on Jun. 13, 2001, provisional application No. 60/302,916, filed on Jul. 3, 2001, provisional application No. 60/302,937, filed on Jul. 2, 2001, provisional application No. 60/306,202, filed on Jul. 18, 2001, provisional application No. 60/307,756, filed on Jul. 25, 2001, provisional application No. 60/308,492, filed on Jul. 27, 2001, provisional application No. 60/312,141, filed on Aug. 13, 2001, provisional application No. 60/323,975, filed on Sep. 21, 2001, provisional application No. 60/324,729, filed on Sep. 24, 2001, provisional application No. 60/335,970, filed on Nov. 13, 2001, provisional application No. 60/349,989, filed on Jan. 16, 2002, provisional application No. 60/351,797, filed on Jan. 25, 2002, provisional application No. 60/406,138, filed on Aug. 27, 2002, provisional application No. 60/452,159, filed on Mar. 5, 2003, provisional application No. 60/496,550, filed on Aug. 20, 2003, provisional application No. 60/496,568, filed on Aug.

20, 2003, provisional application No. 60/496,574, filed on Aug. 20, 2003, provisional application No. 60/533,575, filed on Dec. 31, 2003, provisional application No. 60/533,598, filed on Dec. 31, 2003, provisional application No. 60/533,791, filed on Dec. 31, 2003, provisional application No. 60/533,811, filed on Dec. 31, 2003, provisional application No. 60/533,852, filed on Dec. 31, 2003, provisional application No. 60/540,377, filed on Jan. 29, 2004, provisional application No. 60/667,485, filed on Mar. 31, 2005.

(56) References Cited

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 15,262 | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,584,086 A | 5/1926 | Fonda |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |

| | | | | | |
|---|---|---|---|---|---|
| 2,913,025 A | 11/1959 | Richards | 3,863,208 A | 1/1975 | Balban |
| 2,913,581 A | 11/1959 | Simonton et al. | 3,874,747 A | 4/1975 | Case et al. |
| 2,937,672 A | 5/1960 | Gjerde | 3,880,032 A | 4/1975 | Green |
| 2,945,516 A | 7/1960 | Edgemond, Jr. et al. | 3,882,744 A | 5/1975 | McCarroll |
| 2,954,118 A | 9/1960 | Anderson | 3,886,413 A | 5/1975 | Dow et al. |
| 2,957,166 A | 10/1960 | Gluck | 3,889,567 A | 6/1975 | Sato et al. |
| 2,978,084 A | 4/1961 | Vilkaitis | 3,905,263 A | 9/1975 | Smith |
| 2,984,268 A | 5/1961 | Vuichard | 3,922,785 A | 12/1975 | Fushiya |
| 2,991,593 A | 7/1961 | Cohen | 3,924,688 A | 12/1975 | Cooper et al. |
| 3,005,477 A | 10/1961 | Sherwen | 3,931,727 A | 1/1976 | Luenser |
| 3,007,501 A | 11/1961 | Mundell et al. | 3,935,777 A | 2/1976 | Bassett |
| 3,011,529 A | 12/1961 | Copp | 3,942,607 A | 3/1976 | Sobat |
| 3,011,610 A | 12/1961 | Stiebel et al. | 3,945,286 A | 3/1976 | Smith |
| 3,013,592 A | 12/1961 | Ambrosio et al. | 3,946,631 A | 3/1976 | Malm |
| 3,021,881 A | 2/1962 | Edgemond, Jr. et al. | 3,947,734 A | 3/1976 | Flyer |
| 3,035,995 A | 5/1962 | Seeley et al. | 3,949,636 A | 4/1976 | Ball et al. |
| 3,047,116 A | 7/1962 | Stiebel et al. | 3,953,770 A | 4/1976 | Hayashi |
| 3,085,602 A | 4/1963 | Gaskell | 3,960,310 A | 6/1976 | Nussbaum |
| 3,105,530 A | 10/1963 | Peterson | 3,967,161 A | 6/1976 | Lichtblau |
| 3,129,731 A | 4/1964 | Tyrrell | 3,974,565 A | 8/1976 | Ellis |
| 3,163,732 A | 12/1964 | Abbott | 3,975,600 A | 8/1976 | Marston |
| 3,184,001 A | 5/1965 | Reinsch et al. | 3,978,624 A | 9/1976 | Merkel et al. |
| 3,186,256 A | 6/1965 | Reznick | 3,994,192 A | 11/1976 | Faig |
| 3,207,273 A | 9/1965 | Jurin | 4,007,679 A | 2/1977 | Edwards |
| 3,213,731 A | 10/1965 | Renard | 4,016,490 A | 4/1977 | Weckenmann et al. |
| 3,224,474 A | 12/1965 | Bloom | 4,026,174 A | 5/1977 | Fierro |
| 3,232,326 A | 2/1966 | Speer et al. | 4,026,177 A | 5/1977 | Lokey |
| 3,246,205 A | 4/1966 | Miller | 4,029,159 A | 6/1977 | Nymann |
| 3,249,134 A | 5/1966 | Vogl et al. | 4,047,156 A | 9/1977 | Atkins |
| 3,274,876 A | 9/1966 | Debus | 4,048,886 A | 9/1977 | Zettler |
| 3,276,497 A | 10/1966 | Heer | 4,060,160 A | 11/1977 | Lieber |
| 3,280,861 A | 10/1966 | Gjerde | 4,063,777 A | 12/1977 | Takada |
| 3,306,149 A | 2/1967 | John | 4,070,940 A | 1/1978 | McDaniel et al. |
| 3,313,185 A | 4/1967 | Drake et al. | 4,075,961 A | 2/1978 | Harris |
| 3,315,715 A | 4/1967 | Mytinger | 4,077,161 A | 3/1978 | Wyle et al. |
| 3,323,814 A | 6/1967 | Phillips | 4,085,303 A | 4/1978 | McIntyre et al. |
| 3,337,008 A | 8/1967 | Trachte | 4,090,345 A | 5/1978 | Harkness |
| 3,356,111 A | 12/1967 | Mitchell | 4,091,698 A | 5/1978 | Obear et al. |
| 3,368,596 A | 2/1968 | Comer | 4,106,378 A | 8/1978 | Kaiser |
| 3,386,322 A | 6/1968 | Stone et al. | 4,117,752 A | 10/1978 | Yoneda |
| 3,439,183 A | 4/1969 | Hurst, Jr | 4,145,940 A | 3/1979 | Woloveke et al. |
| 3,445,835 A | 5/1969 | Fudaley | 4,152,833 A | 5/1979 | Phillips |
| 3,454,286 A | 7/1969 | Anderson et al. | 4,161,649 A | 7/1979 | Klos et al. |
| 3,456,696 A | 7/1969 | Gregory et al. | 4,175,452 A | 11/1979 | Idel |
| 3,512,440 A | 5/1970 | Frydmann | 4,184,394 A | 1/1980 | Gjerde |
| 3,538,964 A | 11/1970 | Warrick et al. | 4,190,000 A | 2/1980 | Shaull et al. |
| 3,540,338 A | 11/1970 | McEwan et al. | 4,195,722 A | 4/1980 | Anderson et al. |
| 3,547,232 A | 12/1970 | Fergle | 4,199,930 A | 4/1980 | Lebet et al. |
| 3,554,067 A | 1/1971 | Scutella | 4,200,002 A | 4/1980 | Takahashi |
| 3,566,934 A | 3/1971 | Thrasher | 4,206,666 A | 6/1980 | Ashton |
| 3,566,996 A | 3/1971 | Crossman | 4,206,910 A | 6/1980 | Biesemeyer |
| 3,580,376 A | 5/1971 | Loshbough | 4,249,117 A | 2/1981 | Leukhardt et al. |
| 3,581,784 A | 6/1971 | Warrick et al. | 4,249,442 A | 2/1981 | Fittery |
| 3,593,266 A | 7/1971 | Van Sickle | 4,251,599 A | 2/1981 | McCormick |
| 3,613,748 A | 10/1971 | De Pue | 4,255,995 A | 3/1981 | Connor |
| 3,621,894 A | 11/1971 | Niksich | 4,262,278 A | 4/1981 | Howard et al. |
| 3,648,126 A | 3/1972 | Boos et al. | 4,267,914 A | 5/1981 | Saar |
| 3,670,788 A | 6/1972 | Pollak et al. | 4,270,427 A | 6/1981 | Colberg et al. |
| 3,675,444 A | 7/1972 | Whipple | 4,276,459 A | 6/1981 | Willett et al. |
| 3,680,609 A | 8/1972 | Menge | 4,276,799 A | 7/1981 | Muehling |
| 3,688,815 A | 9/1972 | Ridenour | 4,291,794 A | 9/1981 | Bauer |
| 3,695,116 A | 10/1972 | Baur | 4,305,442 A | 12/1981 | Currie |
| 3,696,844 A | 10/1972 | Bernatschek | 4,319,146 A | 3/1982 | Wires, Sr. |
| 3,716,113 A | 2/1973 | Kobayashi et al. | 4,321,841 A | 3/1982 | Felix |
| 3,719,103 A | 3/1973 | Streander | 4,334,450 A | 6/1982 | Benuzzi |
| 3,740,000 A | 6/1973 | Takada | 4,351,423 A | 9/1982 | Rogier |
| 3,745,546 A | 7/1973 | Struger et al. | 4,372,202 A | 2/1983 | Cameron |
| 3,749,933 A | 7/1973 | Davidson | 4,372,427 A | 2/1983 | Rogier |
| 3,754,493 A | 8/1973 | Niehaus et al. | 4,374,552 A | 2/1983 | Dayen |
| 3,772,590 A | 11/1973 | Mikulecky et al. | 4,385,539 A | 5/1983 | Meyerhoefer et al. |
| 3,785,230 A | 1/1974 | Lokey | 4,391,358 A | 7/1983 | Haeger |
| 3,793,915 A | 2/1974 | Hujer | 4,418,597 A | 12/1983 | Krusemark et al. |
| 3,805,639 A | 4/1974 | Peter | 4,427,042 A | 1/1984 | Mitchell et al. |
| 3,805,658 A | 4/1974 | Scott et al. | 4,453,112 A | 6/1984 | Sauer et al. |
| 3,808,932 A | 5/1974 | Russell | 4,466,170 A | 8/1984 | Davis |
| 3,829,850 A | 8/1974 | Guetersloh | 4,466,233 A | 8/1984 | Thesman |
| 3,829,970 A | 8/1974 | Anderson | 4,470,046 A | 9/1984 | Betsill |
| 3,858,095 A | 12/1974 | Friemann et al. | 4,492,291 A | 1/1985 | Chometon et al. |
| 3,861,016 A | 1/1975 | Johnson et al. | 4,503,739 A | 3/1985 | Konieczka |

| | | | | | | |
|---|---|---|---|---|---|---|
| 4,510,489 A | 4/1985 | Anderson, III et al. | | 5,201,110 A | 4/1993 | Bane |
| 4,512,224 A | 4/1985 | Terauchi | | 5,201,684 A | 4/1993 | DeBois, III |
| 4,518,043 A | 5/1985 | Anderson et al. | | 5,201,863 A | 4/1993 | Peot |
| 4,528,488 A * | 7/1985 | Susemihl .................. 83/DIG. 1 | | 5,206,625 A | 4/1993 | Davis |
| 4,532,501 A | 7/1985 | Hoffman | | 5,207,253 A | 5/1993 | Hoshino et al. |
| 4,532,844 A | 8/1985 | Chang et al. | | 5,212,621 A | 5/1993 | Panter |
| 4,557,168 A | 12/1985 | Tokiwa | | 5,218,189 A | 6/1993 | Hutchison |
| 4,559,858 A | 12/1985 | Laskowski et al. | | 5,230,269 A | 7/1993 | Shiotani et al. |
| 4,560,033 A | 12/1985 | DeWoody et al. | | 5,231,359 A | 7/1993 | Masuda et al. |
| 4,566,512 A | 1/1986 | Wilson | | 5,231,906 A | 8/1993 | Kogej |
| 4,573,556 A | 3/1986 | Andreasson | | 5,239,978 A | 8/1993 | Plangetis |
| 4,576,073 A | 3/1986 | Stinson | | 5,245,879 A | 9/1993 | McKeon |
| 4,589,047 A | 5/1986 | Gaus et al. | | 5,257,570 A | 11/1993 | Shiotani et al. |
| 4,589,860 A | 5/1986 | Brandenstein et al. | | 5,265,510 A | 11/1993 | Hoyer-Ellefsen |
| 4,599,597 A | 7/1986 | Rotbart | | 5,272,946 A | 12/1993 | McCullough et al. |
| 4,599,927 A | 7/1986 | Eccardt et al. | | 5,276,431 A | 1/1994 | Piccoli et al. |
| 4,606,251 A | 8/1986 | Boileau | | 5,285,708 A | 2/1994 | Bosten et al. |
| 4,615,247 A | 10/1986 | Berkeley | | 5,293,802 A | 3/1994 | Shiotani et al. |
| 4,621,300 A | 11/1986 | Summerer | | 5,320,382 A | 6/1994 | Goldstein et al. |
| 4,625,604 A | 12/1986 | Handler et al. | | 5,321,230 A | 6/1994 | Shanklin et al. |
| 4,637,188 A | 1/1987 | Crothers | | 5,331,875 A | 7/1994 | Mayfield |
| 4,637,289 A | 1/1987 | Ramsden | | 5,353,670 A | 10/1994 | Metzger, Jr. |
| 4,644,832 A | 2/1987 | Smith | | 5,377,554 A | 1/1995 | Reulein et al. |
| 4,653,189 A | 3/1987 | Andreasson | | 5,377,571 A | 1/1995 | Josephs |
| 4,657,428 A | 4/1987 | Wiley | | 5,392,568 A | 2/1995 | Howard, Jr. et al. |
| 4,661,797 A | 4/1987 | Schmall | | 5,392,678 A | 2/1995 | Sasaki et al. |
| 4,672,500 A | 6/1987 | Tholome et al. | | 5,401,928 A | 3/1995 | Kelley |
| 4,675,664 A | 6/1987 | Cloutier et al. | | 5,411,221 A | 5/1995 | Collins et al. |
| 4,679,719 A | 7/1987 | Kramer | | 5,423,232 A | 6/1995 | Miller et al. |
| 4,694,721 A | 9/1987 | Brickner, Jr. | | 5,436,613 A | 7/1995 | Ghosh et al. |
| 4,718,229 A | 1/1988 | Riley | | 5,447,085 A | 9/1995 | Gochnauer |
| 4,721,023 A | 1/1988 | Bartlett et al. | | 5,451,750 A | 9/1995 | An |
| 4,722,021 A | 1/1988 | Hornung et al. | | 5,453,903 A | 9/1995 | Chow |
| 4,751,603 A | 6/1988 | Kwan | | 5,471,888 A | 12/1995 | McCormick |
| 4,756,220 A | 7/1988 | Olsen et al. | | 5,480,009 A | 1/1996 | Wieland et al. |
| 4,757,881 A | 7/1988 | Jonsson et al. | | 5,503,059 A | 4/1996 | Pacholok |
| 4,774,866 A | 10/1988 | Dehari et al. | | 5,510,587 A | 4/1996 | Reiter |
| 4,792,965 A | 12/1988 | Morgan | | 5,510,685 A | 4/1996 | Grasselli |
| 4,805,504 A | 2/1989 | Fushiya et al. | | 5,513,548 A | 5/1996 | Garuglieri |
| 4,805,505 A | 2/1989 | Cantlin | | 5,531,147 A | 7/1996 | Serban |
| 4,831,279 A | 5/1989 | Ingraham | | 5,534,836 A | 7/1996 | Schenkel et al. |
| 4,840,135 A | 6/1989 | Yamauchi | | 5,572,916 A | 11/1996 | Takano |
| 4,845,476 A | 7/1989 | Rangeard et al. | | 5,587,618 A | 12/1996 | Hathaway |
| 4,864,455 A | 9/1989 | Shimomura et al. | | 5,592,353 A | 1/1997 | Shinohara et al. |
| 4,875,398 A | 10/1989 | Taylor et al. | | 5,606,889 A | 3/1997 | Bielinski et al. |
| 4,888,869 A | 12/1989 | Leatherman | | 5,619,896 A | 4/1997 | Chen |
| 4,896,607 A | 1/1990 | Hall et al. | | 5,623,860 A | 4/1997 | Schoene et al. |
| 4,906,962 A | 3/1990 | Duimstra | | 5,647,258 A | 7/1997 | Brazell et al. |
| 4,907,679 A | 3/1990 | Menke | | 5,648,644 A | 7/1997 | Nagel |
| 4,934,233 A | 6/1990 | Brundage et al. | | 5,659,454 A | 8/1997 | Vermesse |
| 4,936,876 A | 6/1990 | Reyes | | 5,667,152 A | 9/1997 | Mooring |
| 4,937,554 A | 6/1990 | Herman | | 5,671,633 A | 9/1997 | Wagner |
| 4,962,685 A | 10/1990 | Hagstrom | | 5,695,306 A | 12/1997 | Nygren, Jr. |
| 4,964,450 A | 10/1990 | Hughes et al. | | 5,700,165 A | 12/1997 | Harris et al. |
| 4,965,909 A | 10/1990 | McCullough et al. | | 5,720,213 A | 2/1998 | Sbervelieri |
| 4,969,063 A | 11/1990 | Scott et al. | | 5,722,308 A | 3/1998 | Ceroll et al. |
| 4,975,798 A | 12/1990 | Edwards et al. | | 5,724,875 A | 3/1998 | Meredith et al. |
| 5,020,406 A | 6/1991 | Sasaki et al. | | 5,730,165 A | 3/1998 | Philipp |
| 5,025,175 A | 6/1991 | Dubois, III | | 5,741,048 A | 4/1998 | Eccleston |
| 5,042,348 A | 8/1991 | Brundage et al. | | 5,755,148 A | 5/1998 | Stumpf et al. |
| 5,046,426 A | 9/1991 | Julien et al. | | 5,768,786 A | 6/1998 | Kane et al. |
| 5,052,255 A | 10/1991 | Gaines | | 5,771,742 A | 6/1998 | Bokaie et al. |
| 5,074,047 A | 12/1991 | King | | 5,782,001 A | 7/1998 | Gray |
| 5,081,406 A | 1/1992 | Hughes et al. | | 5,787,779 A | 8/1998 | Garuglieri |
| 5,082,316 A | 1/1992 | Wardlaw | | 5,791,057 A | 8/1998 | Nakamura et al. |
| 5,083,973 A | 1/1992 | Townsend | | 5,791,223 A | 8/1998 | Lanzer |
| 5,086,890 A | 2/1992 | Turczyn et al. | | 5,791,224 A | 8/1998 | Suzuki et al. |
| 5,094,000 A | 3/1992 | Becht et al. | | 5,791,441 A | 8/1998 | Matos et al. |
| 5,116,249 A | 5/1992 | Shiotani et al. | | 5,797,307 A | 8/1998 | Horton |
| 5,119,555 A | 6/1992 | Johnson | | 5,819,619 A | 10/1998 | Miller et al. |
| 5,122,091 A | 6/1992 | Townsend | | 5,819,625 A | 10/1998 | Sbervelieri |
| 5,123,317 A | 6/1992 | Barnes, Jr. et al. | | 5,852,951 A | 12/1998 | Santi |
| 5,146,714 A | 9/1992 | Liiber | | 5,857,507 A | 1/1999 | Puzio et al. |
| 5,148,053 A * | 9/1992 | Dubois, III ............... 192/129 A | | 5,861,809 A | 1/1999 | Eckstein et al. |
| 5,156,508 A | 10/1992 | Grisley | | 5,875,698 A | 3/1999 | Ceroll et al. |
| 5,174,349 A | 12/1992 | Svetlik et al. | | 5,880,954 A | 3/1999 | Thomson et al. |
| 5,184,534 A | 2/1993 | Lee | | 5,921,367 A | 7/1999 | Kashioka et al. |
| 5,198,702 A | 3/1993 | McCullough et al. | | 5,927,857 A | 7/1999 | Ceroll et al. |
| 5,199,343 A | 4/1993 | OBanion | | 5,930,096 A | 7/1999 | Kim |

| | | | | | | |
|---|---|---|---|---|---|---|
| 5,937,720 | A | 8/1999 | Itzov | 6,684,750 B2 | 2/2004 | Yu | |
| 5,942,975 | A | 8/1999 | Sorensen | 6,722,242 B2 | 4/2004 | Chuang | |
| 5,943,932 | A | 8/1999 | Sberveglieri | 6,734,581 B1 | 5/2004 | Griffis | |
| 5,950,514 | A | 9/1999 | Benedict et al. | 6,736,042 B2 | 5/2004 | Behne et al. | |
| 5,963,173 | A | 10/1999 | Lian et al. | 6,742,430 B2 | 6/2004 | Chen | |
| 5,974,927 | A | 11/1999 | Tsune | 6,796,208 B1 | 9/2004 | Jorgensen | |
| 5,989,116 | A | 11/1999 | Johnson et al. | 6,800,819 B2 | 10/2004 | Sato et al. | |
| 6,009,782 | A | 1/2000 | Tajima et al. | 6,826,988 B2 | 12/2004 | Gass et al. | |
| 6,018,284 | A | 1/2000 | Rival et al. | 6,826,992 B1 | 12/2004 | Huang | |
| 6,037,729 | A | 3/2000 | Woods et al. | 6,840,144 B2 | 1/2005 | Huang | |
| D422,290 | S | 4/2000 | Welsh et al. | 6,854,371 B2 | 2/2005 | Yu | |
| 6,050,174 | A | 4/2000 | Schonlau et al. | 6,857,345 B2 | 2/2005 | Gass et al. | |
| 6,052,884 | A | 4/2000 | Steckler et al. | 6,874,397 B2 | 4/2005 | Chang | |
| 6,062,121 | A | 5/2000 | Ceroll et al. | 6,874,399 B2 | 4/2005 | Lee | |
| 6,070,484 | A | 6/2000 | Sakamaki | 6,877,410 B2 | 4/2005 | Gass et al. | |
| 6,095,092 | A | 8/2000 | Chou | 6,880,440 B2 | 4/2005 | Gass et al. | |
| 6,109,157 | A | 8/2000 | Talesky | 6,883,397 B2 | 4/2005 | Kimizuka | |
| 6,112,785 | A | 9/2000 | Yu | 6,889,585 B1 | 5/2005 | Harris et al. | |
| 6,119,984 | A | 9/2000 | Devine | 6,920,814 B2 | 7/2005 | Gass et al. | |
| 6,131,629 | A | 10/2000 | Puzio et al. | 6,922,153 B2 | 7/2005 | Pierga et al. | |
| 6,133,818 | A | 10/2000 | Hsieh et al. | 6,945,148 B2 | 9/2005 | Gass et al. | |
| 6,141,192 | A | 10/2000 | Garzon | 6,945,149 B2 | 9/2005 | Gass et al. | |
| 6,148,504 | A | 11/2000 | Schmidt et al. | 6,957,601 B2 * | 10/2005 | Gass et al. | 83/62.1 |
| 6,148,526 | A | 11/2000 | Kirn et al. | 6,968,767 B2 | 11/2005 | Yu | |
| 6,148,703 | A | 11/2000 | Ceroll et al. | 6,986,370 B1 | 1/2006 | Schoene et al. | |
| 6,150,826 | A | 11/2000 | Hokodate et al. | 6,994,004 B2 | 2/2006 | Gass et al. | |
| 6,161,459 | A | 12/2000 | Ceroll et al. | 6,997,090 B2 | 2/2006 | Gass et al. | |
| 6,170,370 | B1 | 1/2001 | Sommerville | 7,000,514 B2 | 2/2006 | Gass et al. | |
| 6,244,149 | B1 | 6/2001 | Ceroll et al. | 7,024,975 B2 | 4/2006 | Gass et al. | |
| 6,250,190 | B1 | 6/2001 | Ceroll et al. | 7,055,417 B1 | 6/2006 | Gass et al. | |
| 6,257,061 | B1 | 7/2001 | Nonoyama et al. | 7,077,039 B2 | 7/2006 | Gass et al. | |
| 6,283,002 | B1 | 9/2001 | Chiang | 7,098,800 B2 | 8/2006 | Gass | |
| 6,295,910 | B1 | 10/2001 | Childs et al. | 7,100,483 B2 | 9/2006 | Gass et al. | |
| 6,312,028 | B1 | 11/2001 | Wilkosz | 7,137,326 B2 | 11/2006 | Gass et al. | |
| 6,325,195 | B1 | 12/2001 | Doherty | 7,171,879 B2 | 2/2007 | Gass et al. | |
| 6,330,848 | B1 | 12/2001 | Nishio et al. | 7,197,969 B2 | 4/2007 | Gass et al. | |
| 6,336,273 | B1 | 1/2002 | Nilsson et al. | 7,210,383 B2 | 5/2007 | Gass et al | |
| 6,352,137 | B1 | 3/2002 | Stegall et al. | 7,357,056 B2 | 4/2008 | Gass et al. | |
| 6,357,328 | B1 | 3/2002 | Ceroll et al. | 7,373,863 B2 | 5/2008 | O'Banion et al. | |
| 6,361,092 | B1 | 3/2002 | Eagle et al. | 7,472,634 B2 * | 1/2009 | Gass et al. | 83/58 |
| 6,366,099 | B1 | 4/2002 | Reddi | 7,509,899 B2 * | 3/2009 | Gass et al. | 83/62.1 |
| 6,376,939 | B1 | 4/2002 | Suzuki et al. | 7,827,889 B2 * | 11/2010 | Carrier | 192/129 R |
| 6,404,098 | B1 | 6/2002 | Kayama et al. | 7,895,927 B2 * | 3/2011 | Gass | 83/62.1 |
| 6,405,624 | B2 | 6/2002 | Sutton | 8,079,292 B2 * | 12/2011 | Gass et al. | 192/129 R |
| 6,418,829 | B1 | 7/2002 | Pilchowski | 2001/0032534 A1 | 10/2001 | Ceroll et al. | |
| 6,420,814 | B1 | 7/2002 | Bobbio | 2002/0017175 A1 | 2/2002 | Gass et al. | |
| 6,427,570 | B1 | 8/2002 | Miller et al. | 2002/0017176 A1 | 2/2002 | Gass et al. | |
| 6,430,007 | B1 | 8/2002 | Jabbari | 2002/0017178 A1 | 2/2002 | Gass et al. | |
| 6,431,425 | B1 | 8/2002 | Moorman et al. | 2002/0017179 A1 | 2/2002 | Gass et al. | |
| 6,450,077 | B1 | 9/2002 | Ceroll et al. | 2002/0017180 A1 | 2/2002 | Gass et al. | |
| 6,453,786 | B1 | 9/2002 | Ceroll et al. | 2002/0017181 A1 | 2/2002 | Gass et al. | |
| 6,460,442 | B2 | 10/2002 | Talesky et al. | 2002/0017182 A1 | 2/2002 | Gass et al. | |
| 6,471,106 | B1 | 10/2002 | Reining | 2002/0017183 A1 | 2/2002 | Gass et al. | |
| 6,479,958 | B1 | 11/2002 | Thompson et al. | 2002/0017184 A1 | 2/2002 | Gass et al. | |
| 6,484,614 | B1 | 11/2002 | Huang | 2002/0017336 A1 | 2/2002 | Gass et al. | |
| D466,913 | S | 12/2002 | Ceroll et al. | 2002/0020261 A1 | 2/2002 | Gass et al. | |
| 6,492,802 | B1 | 12/2002 | Bielski | 2002/0020262 A1 | 2/2002 | Gass et al. | |
| D469,354 | S | 1/2003 | Curtsinger | 2002/0020263 A1 | 2/2002 | Gass et al. | |
| 6,502,493 | B1 | 1/2003 | Eccardt et al. | 2002/0020265 A1 | 2/2002 | Gass et al. | |
| 6,530,303 | B1 | 3/2003 | Parks et al. | 2002/0020271 A1 | 2/2002 | Gass et al. | |
| 6,536,536 | B1 | 3/2003 | Gass et al. | 2002/0043776 A1 | 4/2002 | Chuang | |
| 6,543,324 | B2 | 4/2003 | Dils | 2002/0050201 A1 | 5/2002 | Lane et al. | |
| 6,546,835 | B2 | 4/2003 | Wang | 2002/0056348 A1 | 5/2002 | Gass et al. | |
| 6,564,909 | B1 | 5/2003 | Razzano | 2002/0056349 A1 | 5/2002 | Gass et al. | |
| 6,575,067 | B2 | 6/2003 | Parks et al. | 2002/0056350 A1 | 5/2002 | Gass et al. | |
| 6,578,460 | B2 | 6/2003 | Sartori | 2002/0059853 A1 | 5/2002 | Gass et al. | |
| 6,578,856 | B2 | 6/2003 | Kahle | 2002/0059854 A1 | 5/2002 | Gass et al. | |
| 6,581,655 | B2 | 6/2003 | Huang | 2002/0069734 A1 | 6/2002 | Gass et al. | |
| 6,595,096 | B2 | 7/2003 | Ceroll et al. | 2002/0088325 A1 | 7/2002 | Talesky et al. | |
| D478,917 | S | 8/2003 | Ceroll et al. | 2002/0096030 A1 | 7/2002 | Wang | |
| 6,601,493 | B1 | 8/2003 | Crofutt | 2002/0096591 A1 | 7/2002 | Tanji | |
| 6,607,015 | B1 | 8/2003 | Chen | 2002/0109036 A1 | 8/2002 | Denen et al. | |
| D479,538 | S | 9/2003 | Welsh et al. | 2002/0134212 A1 | 9/2002 | Ceroll et al. | |
| 6,617,720 | B1 | 9/2003 | Egan, III et al. | 2002/0170399 A1 | 11/2002 | Gass et al. | |
| 6,619,348 | B2 | 9/2003 | Wang | 2002/0170400 A1 | 11/2002 | Gass | |
| 6,640,683 | B2 | 11/2003 | Lee | 2002/0174755 A1 | 11/2002 | Behne et al. | |
| 6,644,157 | B2 | 11/2003 | Huang | 2002/0190581 A1 | 12/2002 | Gass et al. | |
| 6,647,847 | B2 | 11/2003 | Hewitt et al. | 2003/0000359 A1 | 1/2003 | Eccardt et al. | |
| 6,659,233 | B2 | 12/2003 | DeVlieg | 2003/0002942 A1 | 1/2003 | Gass et al. | |

| | | | |
|---|---|---|---|
| 2003/0005588 A1 | 1/2003 | Gass et al. | |
| 2003/0015253 A1 | 1/2003 | Gass et al. | |
| 2003/0019341 A1 | 1/2003 | Gass et al. | |
| 2003/0020336 A1 | 1/2003 | Gass et al. | |
| 2003/0037651 A1 | 2/2003 | Gass et al. | |
| 2003/0037655 A1 | 2/2003 | Chin-Chin | |
| 2003/0056853 A1 | 3/2003 | Gass et al. | |
| 2003/0058121 A1 | 3/2003 | Gass et al. | |
| 2003/0074873 A1 | 4/2003 | Freiberg et al. | |
| 2003/0089212 A1 | 5/2003 | Parks et al. | |
| 2003/0090224 A1 | 5/2003 | Gass et al. | |
| 2003/0101857 A1 | 6/2003 | Chuang | |
| 2003/0109798 A1 | 6/2003 | Kermani | |
| 2003/0131703 A1 | 7/2003 | Gass et al. | |
| 2003/0140749 A1 | 7/2003 | Gass et al. | |
| 2003/0213349 A1 | 11/2003 | Chang | |
| 2004/0011177 A1 | 1/2004 | Huang | |
| 2004/0040426 A1 | 3/2004 | Gass et al. | |
| 2004/0060404 A1 | 4/2004 | Metzger, Jr. | |
| 2004/0103544 A1 | 6/2004 | Hartmann | |
| 2004/0104085 A1 | 6/2004 | Lang et al. | |
| 2004/0118261 A1 | 6/2004 | Garcia et al. | |
| 2004/0159198 A1 | 8/2004 | Peot et al. | |
| 2004/0194594 A1 | 10/2004 | Dils et al. | |
| 2004/0200329 A1 | 10/2004 | Sako | |
| 2004/0226424 A1 | 11/2004 | O'Banion et al. | |
| 2004/0226800 A1 | 11/2004 | Pierga et al. | |
| 2004/0255745 A1 | 12/2004 | Peot et al. | |
| 2005/0057206 A1 | 3/2005 | Uneyama | |
| 2005/0066784 A1 | 3/2005 | Gass | |
| 2005/0087049 A1 | 4/2005 | Miller | |
| 2005/0092149 A1 | 5/2005 | Hartmann | |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |
| 2005/0211034 A1 | 9/2005 | Sasaki et al. | |
| 2005/0235793 A1 | 10/2005 | O'Banion et al. | |
| 2005/0268767 A1 | 12/2005 | Pierga et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0096425 A1 | 5/2006 | Keller | |
| 2006/0123960 A1 | 6/2006 | Gass et al. | |
| 2006/0123964 A1 | 6/2006 | Gass et al. | |
| 2006/0179983 A1 | 8/2006 | Gass et al. | |
| 2006/0219076 A1 | 10/2006 | Gass et al. | |
| 2006/0225551 A1 | 10/2006 | Gass | |
| 2006/0230896 A1 | 10/2006 | Gass | |
| 2006/0247795 A1 | 11/2006 | Gass et al. | |
| 2006/0254401 A1 | 11/2006 | Gass et al. | |
| 2006/0272463 A1 | 12/2006 | Gass | |
| 2007/0028733 A1 | 2/2007 | Gass | |
| 2008/0016998 A1 | 1/2008 | Keller | |
| 2009/0178524 A1* | 7/2009 | Gass et al. | 83/62.1 |
| 2010/0236663 A1* | 9/2010 | Gass | 144/329 |
| 2011/0023673 A1* | 2/2011 | Gass | 83/58 |
| 2011/0056351 A1* | 3/2011 | Gass et al. | 83/58 |
| 2011/0072942 A1* | 3/2011 | Gass | 83/58 |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4235161 | 5/1993 |
| DE | 4326313 | 2/1995 |
| DE | 19609771 | 6/1998 |
| DE | 20102704 | 2/2001 |
| EP | 146460 | 11/1988 |
| EP | 0362937 | 4/1990 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |
| WO | WO 01/26064 | 4/2001 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Grizzly Industrial, Inc. Model G0605X/G0606X Extreme Series 12" Table Saw Owner's Manual, Grizzly Industrial, Inc., Oct. 2006.
Decision on Appeal No. 2007-002769 for U.S. Appl. No. 09/929,242, decided Aug. 29, 2007.
Decision on Appeal No. 2009-004424 for U.S. Appl. No. 10/984,643, decided Mar. 25, 2010.
*You Should Have Invented It*, French television show video/DVD.
Operator Injury Mitigation Using Electronic Sensing and Mechanical Braking and Decoupling Devices in Handheld Circular Saws, Erin F. Eppard, date unknown.
Laguna Tools table saw owner's manual, date unknown.

\* cited by examiner

POWER EQUIPMENT WITH DETECTION AND REACTION SYSTEMS

CROSS-REFERENCE TO RELATED APPLICATIONS

This application is a continuation of the following U.S. patent applications, all of which are hereby incorporated by reference in their entireties:

Ser. No. 11/796,819, filed Apr. 30, 2007, which is a continuation of Ser. No. 09/929,426, filed Aug. 13, 2001, issuing as U.S. Pat. No. 7,210,383 on May 1, 2007, which claims the benefit of and priority from a number of U.S. Provisional Patent Applications including Ser. No. 60/225,200, filed Aug. 14, 2000;

Ser. No. 12/655,695, filed Jan. 4, 2010, which is a continuation of Ser. No. 11/975,985, filed Oct. 22, 2007, issuing as U.S. Pat. No. 7,640,835 on Jan. 5, 2010, which is a continuation of Ser. No. 09/929,221, filed Aug. 13, 2001, issuing as U.S. Pat. No. 7,284,467 on Oct. 23, 2007, which claims the benefit of and priority from a number of U.S. Provisional Patent Applications including Ser. No. 60/225,211, filed Aug. 14, 2000;

Ser. No. 12/002,388 filed Dec. 17, 2007, which is a continuation of Ser. No. 09/929,227, filed Aug. 13, 2001, issuing as U.S. Pat. No. 7,308,843 on Dec. 18, 2007, which claims the benefit of and priority from a number of. U.S. Provisional Patent Applications including Ser. No. 60/225,170, filed Aug. 14, 2000;

Ser. No. 11/401,050, filed Apr. 10, 2006, issuing as U.S. Pat. No. 7,788,999 on Sep. 7, 2010, which is a continuation of a number of applications including Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000; Ser. No. 09/929,241, filed Aug. 13, 2001, issuing as U.S. Pat. No. 7,024,975 on Apr. 11, 2006, which in turn claims the benefit of and priority from a number of. U.S. Provisional Patent Applications including Ser. No. 60/225,169, filed Aug. 14, 2000; Ser. No. 09/929,425, filed Aug. 13, 2001, issuing as U.S. Pat. No. 7,137,326 on Nov. 21, 2006, which in turn claims the benefit of and priority from U.S. Provisional Patent Application Ser. No. 60/225,210, filed Aug. 14, 2000; Ser. No. 10/172,553, filed Jun. 13, 2002, issuing as U.S. Pat. No. 7,231,856 on Jun. 19, 2007, which in turn claims the benefit of and priority from U.S. Provisional Patent Application Ser. No. 60/298,207, filed Jun. 13, 2001; Ser. No. 10/189,027, filed Jul. 2, 2002, issuing as U.S. Pat. No. 7,712,403 on May 11, 2010, which in turn claims the benefit of and priority from U.S. Provisional Patent Application Ser. No. 60/302,916, filed Jul. 3, 2001; Ser. No. 10/243,042, filed Sep. 13, 2002, issuing as U.S. Pat. No. 7,197,969 on Apr. 3, 2007, which in turn claims the benefit of and priority from U.S. Provisional Patent Application Ser. No. 60/324,729, filed Sep. 24, 2001; Ser. No. 10/643,296, filed Aug. 18, 2003, now abandoned, which in turn claims the benefit of and priority from U.S. Provisional Patent Application Ser. No. 60/406,138, tiled Aug. 27, 2002; and Ser. No. 10/794,161, filed Mar. 4, 2004, issuing as U.S. Pat. No. 7,098,800 on Aug. 29, 2006, which in turn claims the benefit of and priority from U.S. Provisional Patent Application Ser. No. 60/452,159, filed Mar. 5, 2003;

Ser. No. 12/800,607, filed May 19, 2010, issuing as U.S. Pat. No. 7,895,927 on Mar. 1, 2011, which is a continuation of a number of applications, including Ser. No. 11/542,938, filed Oct. 2, 2006, now abandoned, which in turn is a continuation of a number of applications, including Ser. No. 10/984,643, filed Nov. 8, 2004, which also is a continuation of a number of applications, including Ser. No. 09/929,226, filed Aug. 13, 2001, issuing as U.S. Pat. No. 6,920,814 on Jul. 26, 2005, which in turn claims the benefit of and priority from U.S. Provisional Patent Application Ser. No. 60/225,206, filed Aug. 14, 2000; Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000; Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000; Ser. No. 10/051,782, filed Jan. 15, 2002, issuing as U.S. Pat. No. 6,877,410 on Apr. 12, 2005, which in turn claims the benefit of and priority from U.S. Provisional Patent Application Ser. No. 60/279,313, filed Mar. 27, 2001; Ser. No. 10/052,806, filed Jan. 16, 2002, issuing as U.S. Pat. No. 6,880,440 on Apr. 19, 2005, which in turn claims the benefit of and priority from U.S. Provisional Patent Application Ser. No. 60/270,942, filed Feb. 22, 2001; Ser. No. 10/205,164, filed Jul. 25, 2002, issuing as U.S. Pat. No. 6,945,149 on Sep. 20, 2005, which in turn claims the benefit of and priority from U.S. Provisional Patent Application Ser. No. 60/307,756, filed Jul. 25, 2001; Ser. No. 10/202,928, filed Jul. 25, 2002, issuing as U.S. Pat. No. 7,000,514 on Feb. 21, 2006, which in turn claims the benefit of and priority from U.S. Provisional Patent Application Ser. No. 60/308,492, filed Jul. 27, 2001; and Ser. No. 10/785,361, filed Feb. 23, 2004, issuing as U.S. Pat. No. 6,997,090 on Feb. 14, 2006, which is a continuation of Ser. No. 10/215,929, filed Aug. 9, 2002, now abandoned, which in turn claims the benefit of and priority from U.S. Provisional Patent Application Ser. No. 60/312,141, filed Aug. 13, 2001;

Ser. No. 11/542,938, filed Oct. 2, 2006, now abandoned, which is a continuation of a number of applications, including Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000; Ser. No. 11/401,774, filed Apr. 11, 2006, issuing as U.S. Pat. No. 7,525,055 on Apr. 28, 2009, which is a continuation of Ser. No. 11/027,322, filed Dec. 31, 2004, now abandoned, which claims the benefit of and priority from U.S. Provisional Patent Application Ser. No. 60/533,598, filed Dec. 31, 2003; Ser. No. 11/445,548, filed Jun. 2, 2006, issuing as U.S. Pat. No. 7,347,131 on Mar. 25, 2008; and Ser. No. 11/506,260, filed Aug. 18, 2006, issuing as U.S. Pat. No. 7,359,174 on Apr. 15, 2008, which is a continuation of a number of application including Ser. No. 10/923,282, filed Aug. 20, 2004, now abandoned, which in turn claims the benefit of and priority from U.S. Provisional Patent Application Ser. No. 60/496,568, filed Aug. 20, 2003;

Ser. No. 12/590,094, filed Nov. 2, 2009, issuing as U.S. Pat. No. 7,958,806 on Jun. 14, 2011 which is a continuation of Ser. No. 09/929,236, filed Aug. 13, 2001, issuing as U.S. Pat. No. 7,610,836 on Nov. 3, 2009, which claims the benefit of and priority from a number of U.S. Provisional Patent Applications including Ser. No. 60/225,201, filed Aug. 14, 2000;

Ser. No. 11/811,719, filed Jun. 11, 2007, issuing as U.S. Pat. No. 7,832,314 on Nov. 16, 2010, which is a continuation of Ser. No. 11/061,162, filed Feb. 18, 2005, issuing as U.S. Pat. No. 7,228,772 on Jun. 12, 2007, which is a continuation of Ser. No. 09/929,244, filed Aug. 13, 2001, issuing as U.S. Pat. No. 6,857,345 on Feb. 22, 2005, which in turn claimed the benefit of and priority from a number of U.S. Provisional Patent Applications including Ser. No. 60/225,212, filed Aug. 14, 2000;

Ser. No. 12/587,695, filed Oct. 9, 2009, issuing as U.S. Pat. No. 7,921,754 on Apr. 12, 2011 which is a continuation of Ser. No. 09/929,237, filed Aug. 13, 2001, issuing as U.S. Pat. No. 7,600,455 on Oct. 13, 2009, which claims the benefit of and priority from a number of U.S. Provisional Patent Applications including Ser. No. 60/225,059, filed Aug. 14, 2000;

Ser. No. 12/661,766, filed Mar. 22, 2010, which is a continuation of Ser. No. 11/810,196, filed Jun. 4, 2007, issuing as U.S. Pat. No. 7,681,479 on Mar. 23, 2010, which is a continuation of Ser. No. 09/929,234, filed Aug. 13, 2001, issuing as U.S. Pat. No. 7,225,712 on Jun. 5, 2007, which claims the benefit of and priority from a number of U.S. Provisional Patent Applications including Ser. No. 60/225,094, filed Aug. 14, 2000;

Ser. No. 12/655,694, filed Jan. 4, 2010, issuing as U.S. Pat. No. 7,908,950 on Mar. 22, 2011, which is a continuation of Ser. No. 12/079,836, filed Mar. 27, 2008, issuing as U.S. Pat. No. 7,640,837 on Jan. 5, 2010, which is a continuation of 09/929,235, filed Aug. 13, 2001, issuing as U.S. Pat. No. 7,350,444 on Apr. 1, 2008, which claims the benefit of and priority from a number of U.S. Provisional Patent Applications including Ser. No. 60/225,058, filed Aug. 14, 2000;

Ser. No. 12/799,211, filed Apr. 19, 2010, which is a continuation of Ser. No. 12/220,946, filed Jul. 29, 2008, issuing as U.S. Pat. No. 7,698,976 on Apr. 20, 2010, which is a continuation of Ser. No. 09/929,238, filed Aug. 13, 2001, now abandoned, which claims the benefit of and priority from a number of U.S. Provisional Patent Applications including Ser. No. 60/225,057, filed Aug. 14, 2000;

Ser. No. 12/590,924, filed Nov. 16, 2009, which is a continuation of Ser. No. 12/154,675, filed May 23, 2008, issuing as U.S. Pat. No. 7,617,752 on Nov. 17, 2009, which is a continuation of Ser. No. 10/053,390, filed Jan. 16, 2002, issuing as U.S. Pat. No. 7,377,199 on May 27, 2008, which is a continuation-in-part of a number of applications including Ser. No. 09/676,190, filed Sep. 29, 2000, issuing as U.S. Pat. No. 7,055,417 on Jun. 6, 2006; and Ser. No. 10/053,390 also claims the benefit of and priority from U.S. Provisional Patent Application Ser. No. 60/270,011, filed Feb. 20, 2001;

Ser. No. 12/313,162, filed Nov. 17, 2008, issuing as U.S. Pat. No. 7,789,002 on Sep. 7, 2010, which is a continuation of Ser. No. 11/348,580, filed Feb. 6, 2006, now abandoned, which is a continuation of a number of applications including Ser. No. 10/052,705, filed Jan. 16, 2002, issuing as U.S. Pat. No. 6,994,004 on Feb. 7, 2006, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001; and Ser. No. 11/348,580 also claims the benefit of and priority from U.S. Provisional Patent Application Ser. No. 60/667,485, filed Mar. 31, 2005; and Ser. No. 12/313,162 is also a continuation of Ser. No. 11/098,984, filed Apr. 4, 2005, issuing as U.S. Pat. No. 7,353,737 on Apr. 8, 2008, which is a continuation of a Ser. No. 09/929,238, filed Aug. 13, 2001, now abandoned, Ser. No. 10/047,066, filed Jan. 14, 2002, issuing as U.S. Pat. No. 6,945,148 on Sep. 20, 2005, and Ser. No. 10/051,782, filed Jan. 15, 2002, issuing as U.S. Pat. No. 6,877,410 on Apr. 12, 2005;

Ser. No. 12/661,993, filed Mar. 26, 2010, which is a continuation of Ser. No. 11/982,972, filed Nov. 5, 2007, issuing as U.S. Pat. No. 7,685,912 on Mar. 30, 2010, which is a continuation of Ser. No. 10/932,339, filed Sep. 1, 2004, issuing as U.S. Pat. No. 7,290,472 on Nov. 6, 2007, which is a continuation of Ser. No. 10/047,066, filed Jan. 14, 2002, issuing as U.S. Pat. No. 6,945,148 on Sep. 20, 2005, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001; and Ser. No. 10/932,339 is also a continuation of Ser. No. 10/050,085, filed Jan. 14, 2002, now abandoned;

Ser. No. 10/100,211, filed Mar. 13, 2002, which claims the benefit of and priority from U.S. Provisional Patent Application Ser. No. 60/275,583, filed Mar. 13, 2001;

Ser. No. 11/256,757, filed Oct. 24, 2005, which is a continuation of Ser. No. 09/955,418, filed Sep. 17, 2001, issuing as U.S. Pat. No. 6,957,601 on Oct. 25, 2005, which in turn claimed the benefit of and priority to a number of U.S. Provisional Patent Applications, including: Ser. No. 60/233,459, filed Sep. 18, 2000, Ser. No. 60/270,011, filed Feb. 20, 2001, Ser. No. 60/270,941, filed Feb. 22, 2001, Ser. No 60/270,942, filed Feb. 22, 2001, Ser. No. 60/273,177, filed Mar. 2, 2001, Ser. No. 60/273,178, filed Mar. 2, 2001, Ser. No. 60/273,902; filed Mar. 6, 2001, Ser. No. 60/275,594; filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,756, filed Jul. 25, 2001, Ser. No. 60/308,492, filed Jul. 27, 2001, and Ser. No. 60/312,141, filed Aug. 13, 2001;

Ser. No. 10/146,527, filed May 15, 2002, which claims the benefit of and priority from U.S. Provisional Patent Application Ser. No. 60/292,100, filed May 17, 2001;

Ser. No. 12/586,469, filed Sep. 21, 2009, which is a continuation of Ser. No. 11/702,330, filed Feb. 5, 2007, issuing as U.S. Pat. No. 7,591,210 on Sep. 22, 2009, which is a continuation of Ser. No. 10/189,031, filed Jul. 2, 2002, issuing as U.S. Pat. No. 7,171,879 on Feb. 6, 2007, which claims the benefit of and priority from U.S. Provisional Patent Application Ser. No. 60/302,937, filed Jul. 2, 2001;

Ser. No. 11/208,214, filed Aug. 19, 2005, issuing as U.S. Pat. No. 7,784,507 on Aug. 31, 2010, which is a continuation of Ser. No. 10/251,576, filed Sep. 20, 2002, now abandoned, which is a continuation of Ser. No. 10/197,975, filed Jul. 18, 2002, now abandoned, and which claimed the benefit of and priority to U.S. Provisional Patent Application Ser. No. 60/323,975, filed Sep. 21, 2001, and Ser. No. 11/208,214 is also a continuation of Ser. No. 09/676,190, filed Sep. 29, 2000, issuing as U.S. Pat. No. 7,055,417 on Jun. 6, 2006, which in turn claimed the benefit of and priority from U.S. Provisional Patent Applications Ser. No. 60/157,340, filed Oct. 1, 1999 and Ser. No. 60/182,866, filed Feb. 16, 2000;

Ser. No. 12/231,080, filed Aug. 29, 2008, issuing as U.S. Pat. No. 7,900,541 on Mar. 8, 2011, which is a continuation of Ser. No. 11/487,717, filed Jul. 17, 2006, issuing as U.S. Pat. No. 7,421,315, on Sep. 2, 2008, which is a continuation of U.S. patent application Ser. No. 10/292,607, filed Nov. 12, 2002, issued as U.S. Pat. No. 7,077,039 on Jul. 18, 2006, which claims the benefit of and priority from U.S. Provisional Patent Application Ser. No. 60/335,970, filed Nov. 13, 2001;

Ser. No. 12/655,962, filed Jan. 11, 2010, now abandoned, which is a continuation of Ser. No. 12/313,277, filed Nov. 17, 2008, issuing as U.S. Pat. No. 7,644,645 on Jan. 12, 2010, which is a continuation of Ser. No. 10/345,630, filed Jan. 15, 2003, which claims the benefit of and priority from U.S. Provisional Patent Application Ser. No. 60/349,989, filed Jan. 16, 2002;

Ser. No. 12/658,759, filed Feb. 12, 2010, now abandoned, which is a continuation of Ser. No. 11/787,471, filed Apr. 17, 2007, issuing as U.S. Pat. No. 7,661,343 on Feb. 16, 2010, which is a continuation of Ser. No. 10/341,260, filed Jan. 13, 2003, now abandoned, which claims the benefit of and priority from U.S. Provisional Patent Application Ser. No. 60/351,797, filed Jan. 25, 2002;

Ser. No. 11/647,676, filed Dec. 29, 2006, issuing as U.S. Pat. No. 7,836,804 on Nov. 23, 2010, which is a continuation of Ser. No. 10/923,290, filed Aug. 20, 2004, issuing as U.S, Pat. No. 7,472,634 on Jan. 6, 2009, which claims the benefit of and priority from U.S. Provisional Patent Application Ser. No. 60/496,550, filed Aug. 20, 2003;

Ser. No. 12/079,820, filed Mar. 27, 2008, issuing as U.S. Pat. No. 7,845,258 on Dec. 7, 2010, which is a continuation of Ser. No. 10/923,273, filed Aug. 20, 2004, issuing as U.S. Pat. No. 7,350,445 on Apr. 1, 2008, which claims the benefit of and priority from U.S. Provisional Patent Application Ser. No. 60/496,574, filed Aug. 20, 2003;

Ser. No. 12/454,569, filed May 18, 2009, which is a continuation of Ser. No. 11/027,600, filed Dec. 31, 2004, issuing as U.S. Pat. No. 7,536,238 on May 19, 2009, which claims the benefit of and priority from U.S. Provisional Patent Application Serial No. 60/533,791, filed Dec. 31, 2003;

Ser. No. 12/799,915, filed May 3, 2010, which is a continuation of Ser. No. 12/322,069, filed Jan. 26, 2009, issuing as U.S. Pat. No. 7,707,918 on May 4, 2010, which is a continuation of U.S. Patent Application Ser. No. 11/107,499, filed Apr. 15, 2005, issuing as U.S. Pat. No. 7,481,140 on Jan. 27, 2009;

Ser. No. 12/077,576, filed Mar. 19, 2008, now abandoned, which is a continuation of Ser. No. 11/027,254, filed Dec. 31, 2004, now abandoned, which claims the benefit of and priority from U.S. Provisional Patent Application Ser. No. 60/533,852, filed Dec. 31, 2003;

Ser. No. 12/799,920, filed May 3, 2010, which is a continuation of Ser. No. 11/026,114, filed Dec. 31, 2004, issuing as U.S. Pat. No. 7,707,920 on May 4, 2010, which claims the benefit of and priority from U.S. Provisional Patent Application Ser. No. 60/533,811, filed Dec. 31, 2003;

Ser. No. 11/026,006, filed Dec. 31, 2004, which claims the benefit of and priority from U.S. Provisional Patent Application Ser. No. 60/533,575, filed Dec. 31, 2003;

Ser. No. 11/045,972, filed Jan. 28, 2005, issuing as U.S. Pat. No. 7,827,890 on Nov. 9, 2010, which claims the benefit of and priority from U.S. Provisional Patent Application Ser. No. 60/540,377, filed Jan. 29, 2004; and Ser. No 12/454,730, filed May 20, 2009, which is a continuation of Ser. No. 11/395,502, filed Mar. 31, 2006, which claims the benefit of and priority from U.S. Provisional Patent Application Ser. No. 60/667,485, filed Mar. 31, 2005.

FIELD

The present disclosure relates to safety systems and more particularly to methods for enhancing the safety of power equipment.

BACKGROUND

Power equipment such as table saws, miter saws and other woodworking machinery include cutting tools like circular saw blades and knife blades that present a risk of injury to a user of the equipment. Accordingly, safety features or systems are incorporated with power equipment to minimize the risk of injury. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50ms-1s to stop the blade. Therefore, the system is too slow to stop the blade quickly enough to avoid serious injury.

DETAILED DESCRIPTION

Figure 1:
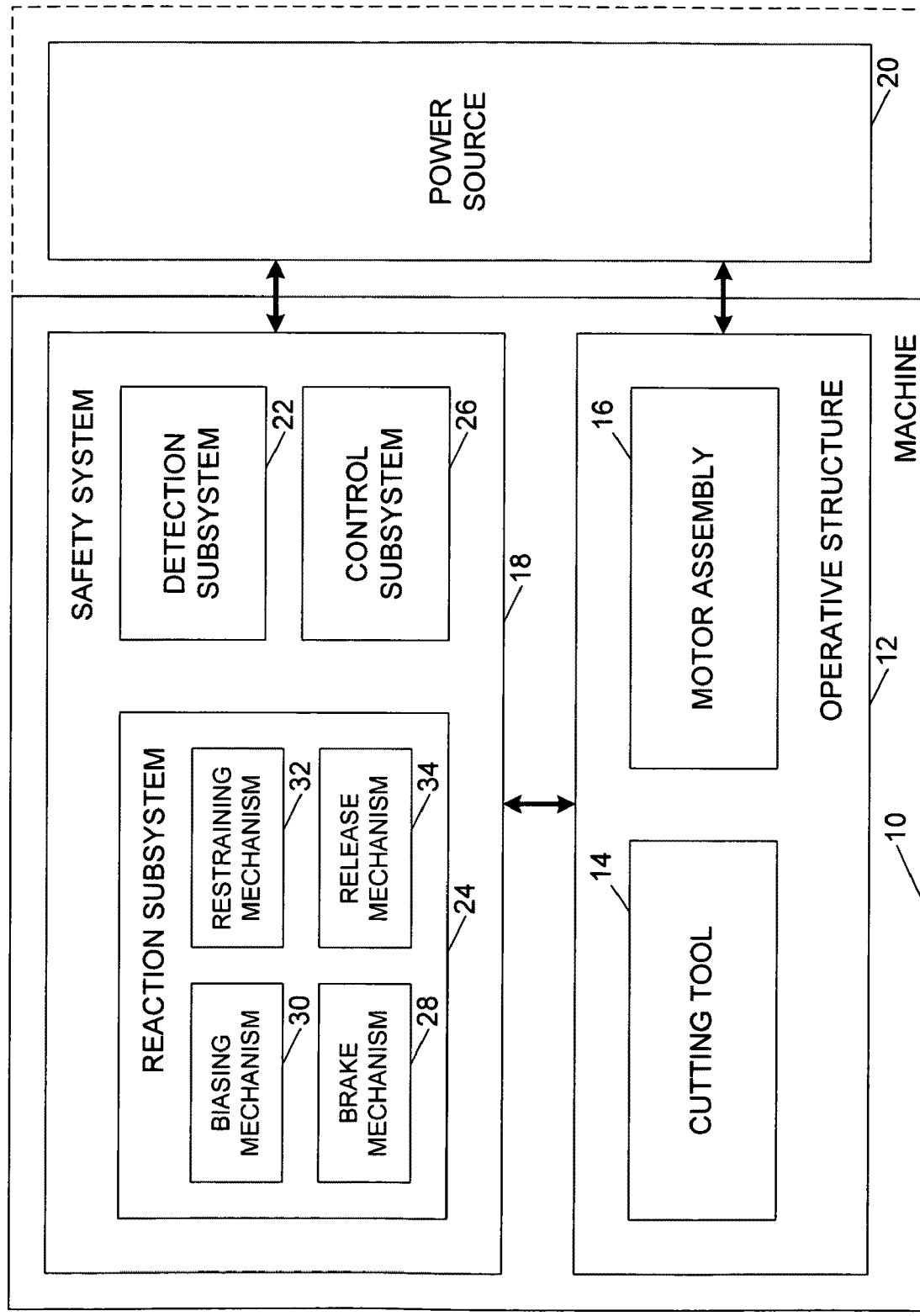
FIG. 1 is a schematic block diagram of a machine with a fast-acting safety system.

A machine that may incorporate a retraction system according to the present disclosure is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
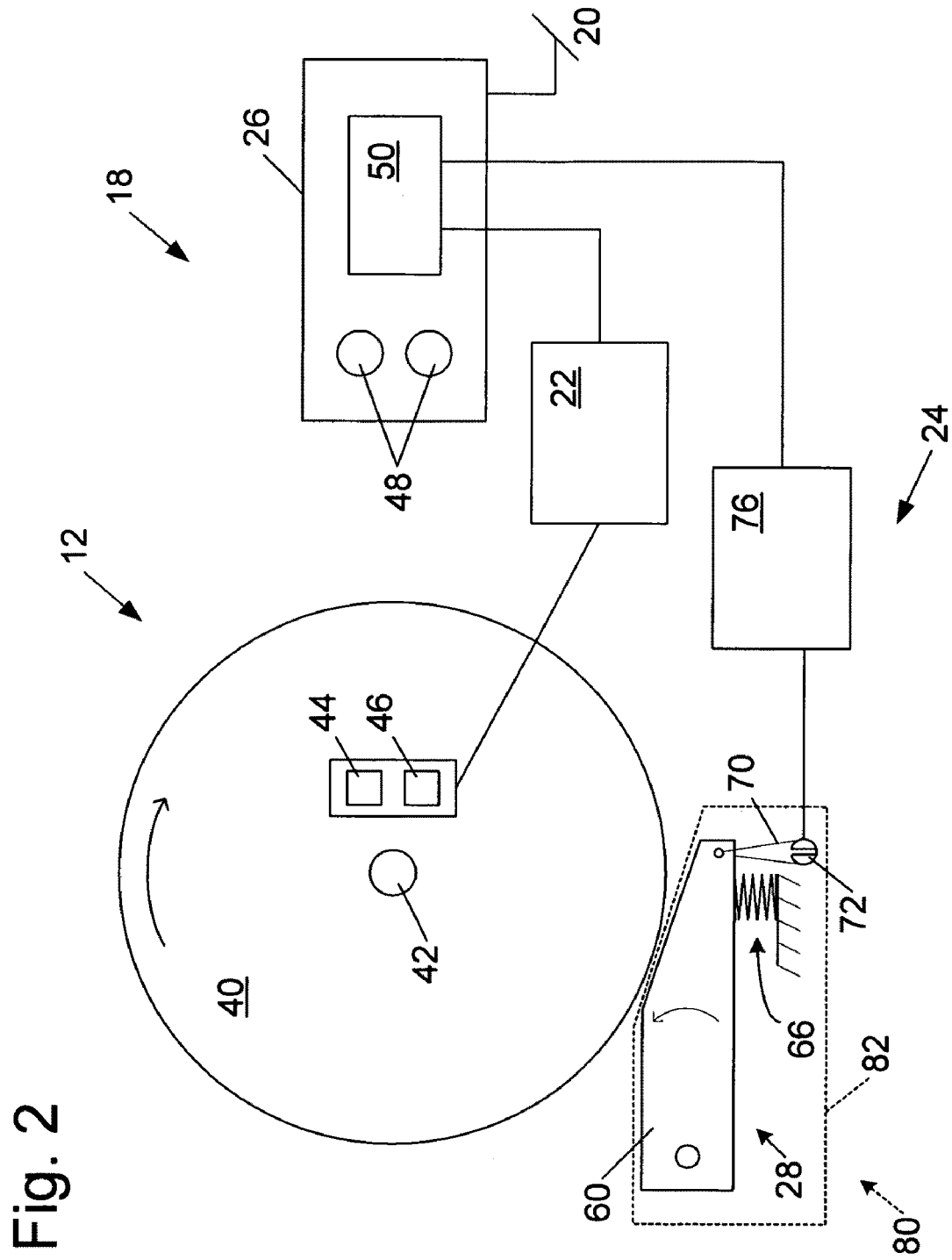
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

Figure 15:
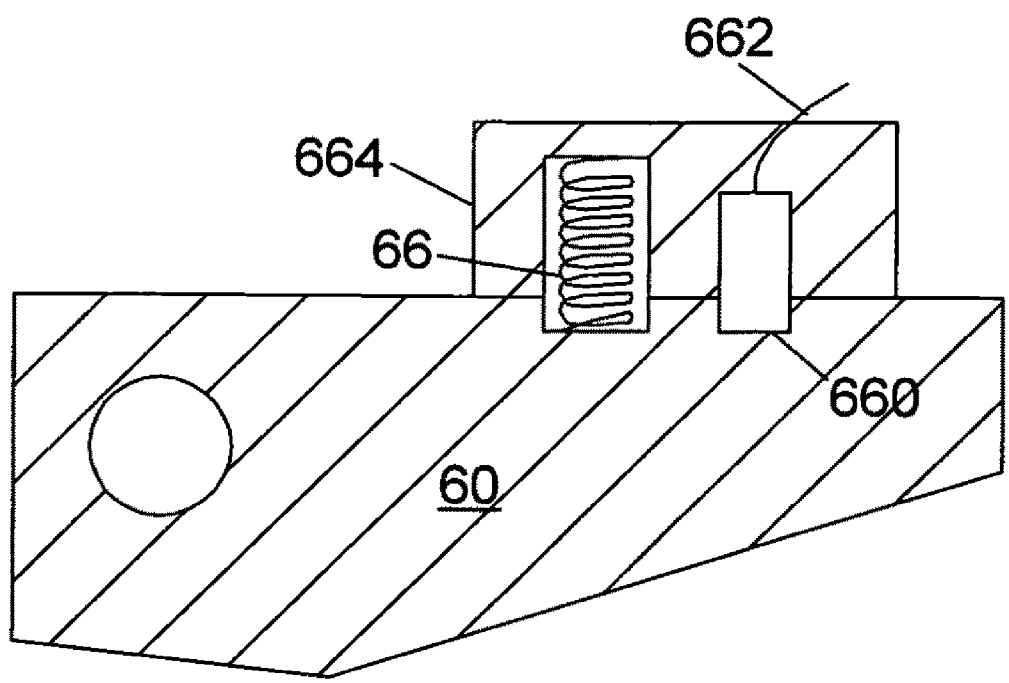
FIG. 15 shows an explosive charge that can be triggered by a firing subsystem.

Other systems can also be used to shift the pawl or pawls into contact with the blade, and firing system 76 may also be used to trigger some action other than burning a fusible member. For example, firing system 76 can fire a small explosive charge to move a pawl. FIG. 15 shows a relatively small, self-contained explosive charge 660 in the form of a squib or detonator that can be used to drive pawl 60 against a blade. An example of a suitable explosive charge is an M-100 detonator available, for example, from Stresau Laboratory, Inc., of Spooner, Wis. Although any suitable explosive charge system may be used, the exemplary embodiment preferably uses a self-contained charge or squib to increase safety and focus the force of the explosion along the direction of movement of the pawl. A trigger line 662 extends from the charge, and it may be connected to firing system 76 to trigger detonation.

Explosive charge 660 can be used to move pawl 60 by inserting the charge between the pawl and a stationary block 664 adjacent the charge. When the charge detonates, the pawl is pushed away from the block. A compression spring 66 is placed between the block and pawl to ensure the pawl does not bounce back from the blade when the charge is detonated. Prior to detonation, the pawl is held away from the blade by the friction-fit of the charge in both the block and pawl. However, the force created upon detonation of the charge is more than sufficient to overcome the friction fit. Alternatively, the pawl may be held away from the blade by other mechanisms such as a frangible member, gravity, a spring between the pawl and block, etc.

Firing system 76 may also trigger a DC solenoid, which can be over-driven with a current surge to create a rapid displacement, a pressurized air or gas cylinder to supply the pressure in place of the spring or charge, or an electromagnet to either repel the pawl against the blade or to release a spring-loaded pawl toward the blade.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

As briefly mentioned above, reaction subsystem 24 can be configured with a retraction system to retract or move a cutting tool away from the point of accidental contact with a user. Moving away from the point of accidental contact reduces the time the cutting tool is in contact with the user, thereby minimizing any injury to the user. Moving the cutting tool away from the point of accidental contact also prevents the cutting tool from moving toward the user, which could increase any injury to the user. For example, a spinning blade in a miter saw has substantial angular momentum, and that angular momentum could cause the blade to move downward toward a user when a brake pawl hits the blade. The spinning blade in a table saw also has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Figure 3:
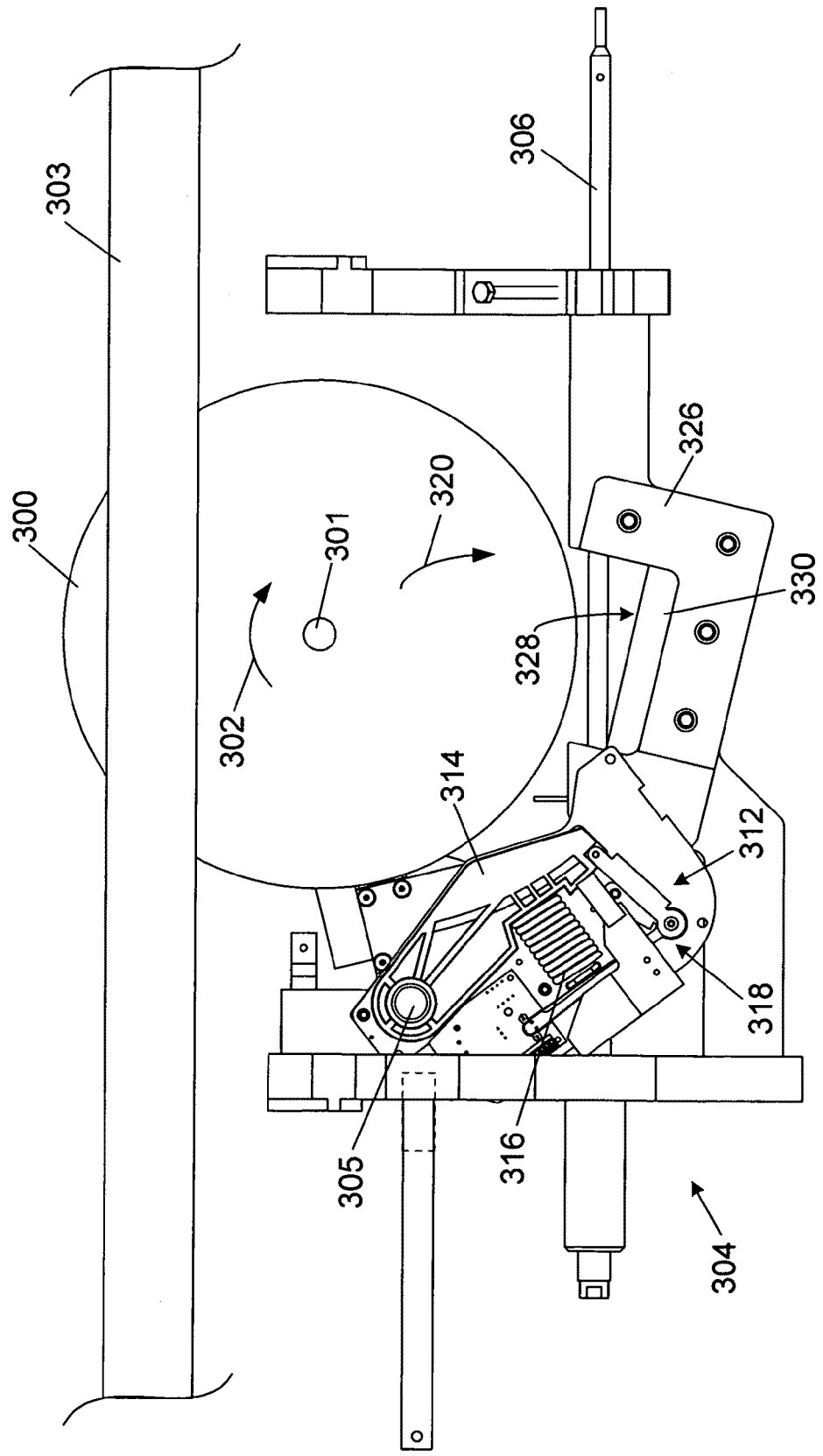
FIG. 3 is a schematic side view of a table saw with a retraction system.
Figure 4:
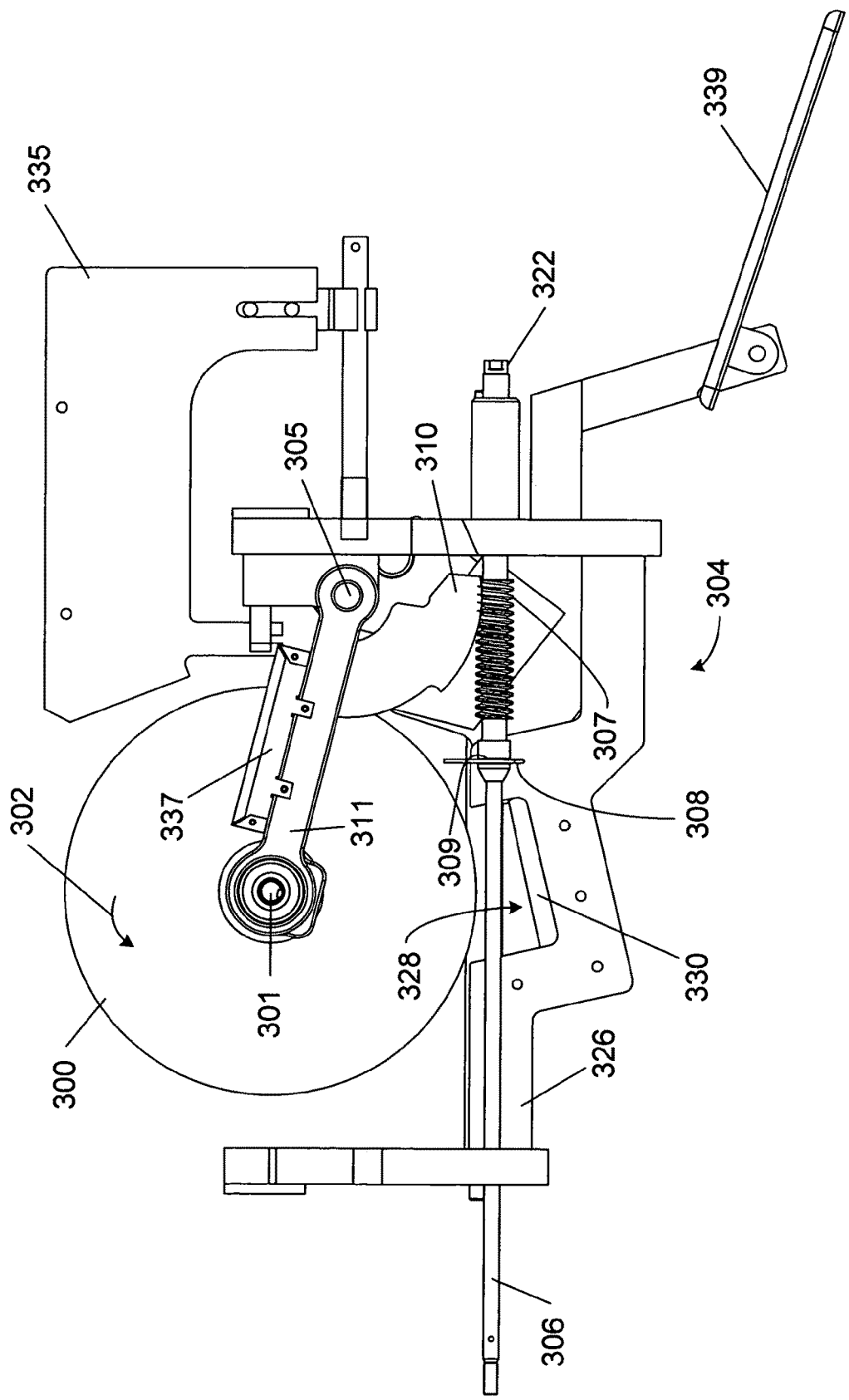
FIG. 4 is a schematic side view of a second side of a table saw with a retraction system.

FIGS. 3 and 4 show side views of a table saw configured with both a retraction system and a braking mechanism. A blade 300 is mounted on an arbor 301 to spin in the direction of arrow 302. A table 303 (not shown in FIG. 4), which defines the work surface or cutting region for the table saw, is adjacent the blade and the blade extends above the table. A support structure 304 may support blade 300 and arbor 301 in any known way, or as described in more detail in U.S. Provisional Patent Application Ser. No. 60/225,058, titled "Table Saw with Improved Safety System," filed Aug. 14, 2000.

Blade 300 is configured to pivot up and down so that a user can position the blade to extend above the table as needed. The blade pivots around a pin 305. A user may pivot the blade to adjust its position by turning a shaft 306 on which a worm gear 307 is mounted. The worm gear is mounted on the shaft so that it turns with the shaft, but so that it may slide on the shaft when necessary, as explained below. Worm gear 307 is mounted on shaft 306 like a collar, with the shaft extending through a longitudinal hole in the worm gear. The worm gear is held in place during normal operation of the saw by a spring clip 308, which is positioned in a groove or channel 309 on the worm gear and which also engages a detent or shoulder on shaft 306 to hold the worm gear in place. The worm gear engages an arcuate rack 310 that supports an arbor block 311, which in turn supports arbor 301 and blade 300. Thus, when a user turns shaft 306, such as by turning a knob attached to the shaft (not shown), worm gear 307 moves arbor block 311 and the blade up or down, depending on the direction that the worm gear is turned.

A brake cartridge 312 is mounted in the saw adjacent blade 300. The brake cartridge includes a pawl 314 biased toward blade 300 by a spring 316. The pawl is held away from blade 300 by a release mechanism 318, as described generally above and as described in more detail in U.S. Provisional Patent Application Ser. No. 60/225,170, entitled "Spring-Biased Brake Mechanism for Power Equipment," U.S. Provisional Patent Application Ser. No. 60/225,169, entitled "Brake Mechanism for Power Equipment," U.S. Provisional Patent Application Ser. No. 60/225,201, entitled "Replaceable Brake Mechanism for Power Equipment," and U.S. Provisional Patent Application Ser. No. 60/225,212, entitled "Brake Positioning System," all filed Aug. 14, 2000. The cartridge is configured so that the release mechanism releases the pawl into the blade upon the receipt of a detection signal, as explained generally above and as explained in more detail in U.S. Provisional Patent Application Ser. No. 60/225,056, titled "Firing Subsystem for use in a Fast-Acting Safety System," filed Aug. 14, 2000.

Brake cartridge 312 is positioned on the blade's pivot axis so that pawl 314 can move around pin 305. Thus, when pawl 314 hits the blade, the angular momentum of the blade is transferred to the arbor block, and the blade, arbor block, rack and cartridge try to retract or move down in the direction of arrow 320. Alternatively, the cartridge may be positioned on a pin different from pin 305, but that still pivots with the blade.

The blade will move down to the extent permitted by the contact between rack 310 and worm gear 307. If the worm gear is fixed in place, the downward movement of the blade may strip teeth on the rack and/or worm gear, and may prevent the blade from moving down as far as desired. In the embodiment shown in FIGS. 3 and 4, the worm gear is adapted to snap free and move on shaft 306 when the pawl hits the blade.

When the pawl hits the blade, the resultant angular momentum impulse causes spring clip 308 to snap loose, allowing the worm gear to slide down the shaft toward an end 322 of the shaft. The spring clip snaps loose because the rack moves down when the blade is stopped, and the rack contacts the worm gear and forces the worm gear to move. The force of the rack against the worm gear causes the spring clip to snap loose. The worm gear is put back in place by moving it back along shaft 306 until the spring clip snaps into place on the shaft.

The table saw shown in FIGS. 3 and 4 also includes a support 326 configured with a seat or region 328 in which is placed an impact-absorbing material 330. The support is positioned under the arbor and arbor block so that when the blade retracts, the arbor block strikes impact-absorbing material 330. Support 326 and impact absorbing material 330 act as a barrier to stop the downward movement of the blade. The support is positioned so that blade 300 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 330 may be attached to the undersurface of the arbor block instead of on support 326. Additionally, support 326 may take many forms. In fact, shaft 306 may be configured and positioned so that it provides a surface to stop the downward movement of the blade.

FIG. 4 also shows a splitter 335 that extends above table 303 behind blade 300 to prevent kickback. A blade guard may also substantially enclose blade 300. FIG. 4 further shows a housing 337 for electronic components relating to the safety system, and a motor mount 339, which are not shown in FIG. 3.

In the construction described above, the angular momentum of the blade causes the blade, arbor block and cartridge to all pivot down away from the cutting region when the pawl strikes the blade. Thus, the angular momentum of the blade causes the retraction. Blade 300 is permitted to move downward a sufficient distance so that the blade is completely retracted. In independent experiments, the safety system depicted in FIGS. 3 and 4 and described above has been shown to retract the blade completely below table 303 within approximately 14 milliseconds after contact is detected. Indeed the downward motion of the blade during retraction is too fast to detect with the human eye, i.e., the blade disappears below table 303 with no discernable transition or downward motion. The ability of the blade to retract minimizes any injury from accidental contact with the blade.

Figure 5:
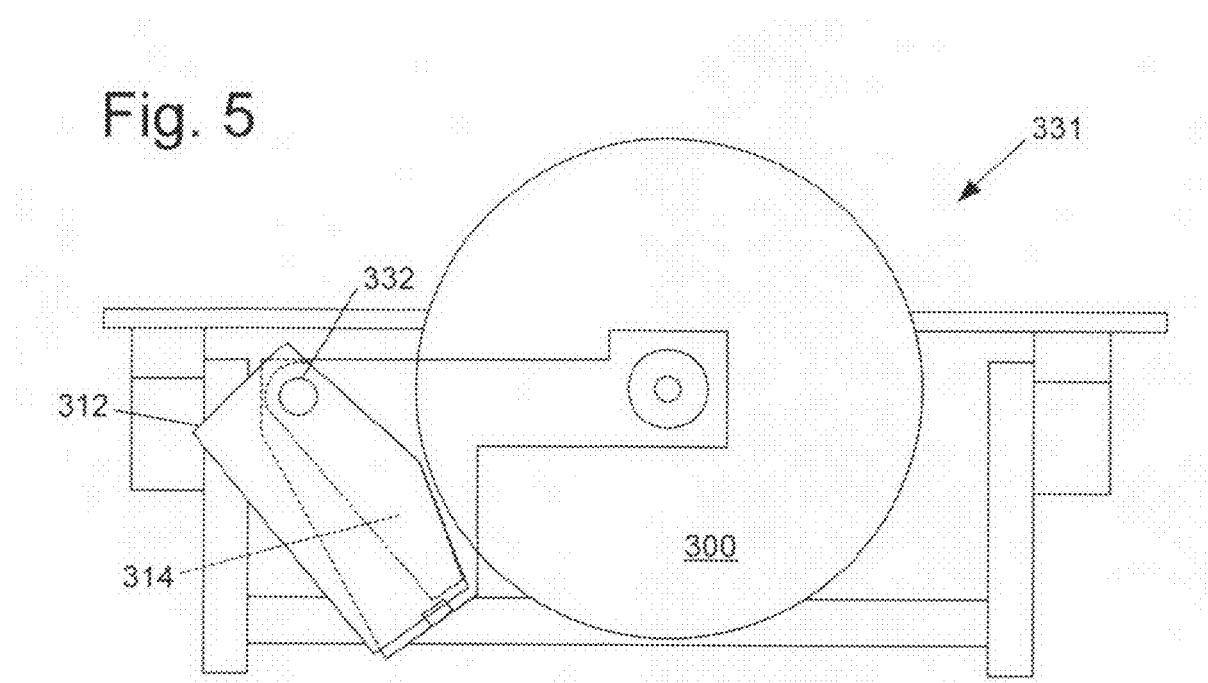
FIG. 5 is a schematic, side view of a saw with another embodiment of a retraction system.

FIG. 5 shows another embodiment of a retraction system used with a brake pawl. A saw 331 includes a blade 300 and a brake cartridge 312 housing a brake pawl 314. The cartridge and pawl are mounted to the frame of the saw by a pin 332. The pin is mounted to the saw in such a way that it may not pivot up and down with the blade. When the blade hits the pawl, the blade climbs down the pawl, or in other words, moves generally around the point of contact with the pawl. The pawl and blade do not pivot downward together, as in the embodiment shown in FIGS. 3 and 4, because the pawl is fixed to the frame of the saw. In this embodiment, the blade retracts by "climbing" down the pawl.

Figure 6:
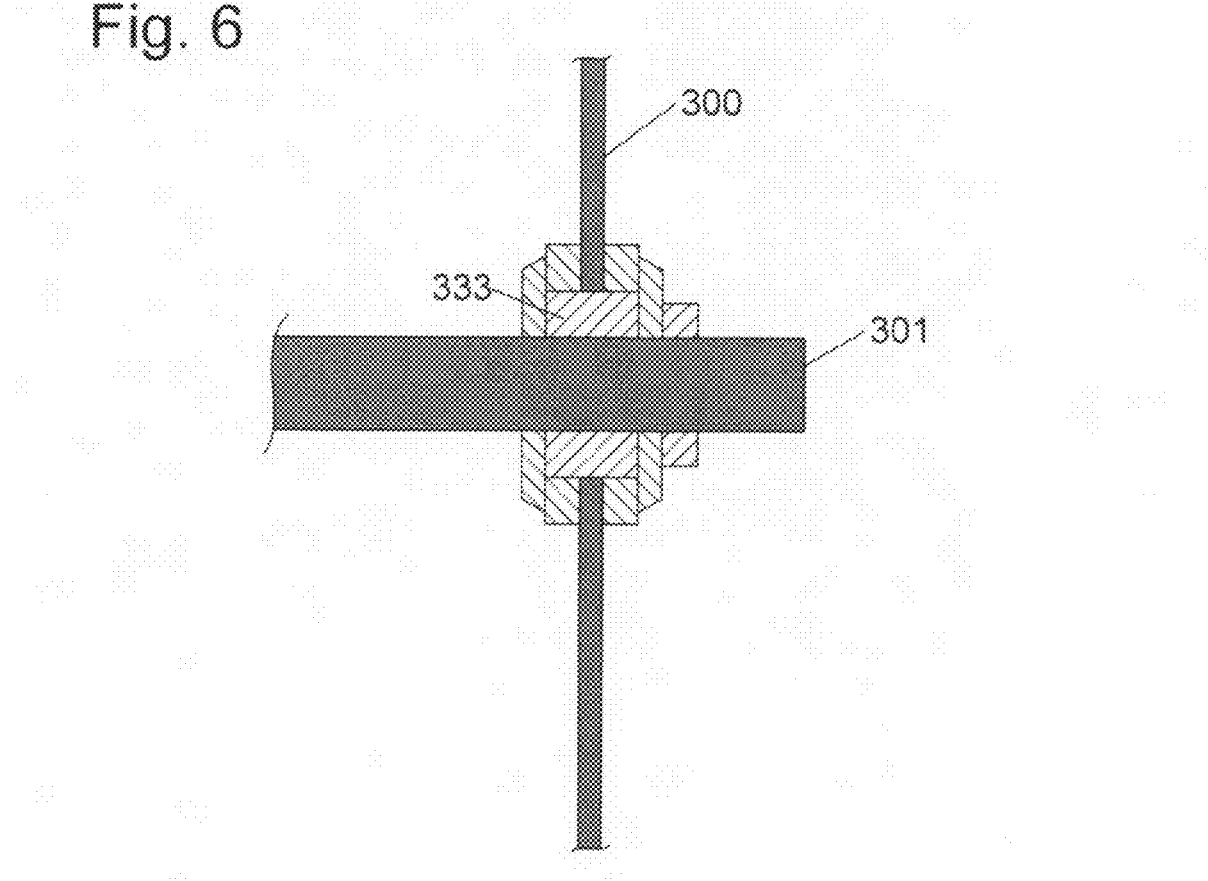
FIG. 6 is a section view of a retraction system using a deformable bushing.

Another embodiment of a retraction system comprises a compressible bushing. Typically, a blade 300 in a table saw, miter saw or other machine is mounted to an arbor over a bushing 333, as shown in FIG. 6. A locking nut, washers and an arbor flange are used to secure the blade to the arbor. Bushing 333 may be constructed from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake. Where a plastic bushing is placed between the blade and the arbor, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade, then the blade will tend to move downward into the bushing and away from the user when the pawl engages the blade.

Figure 7:
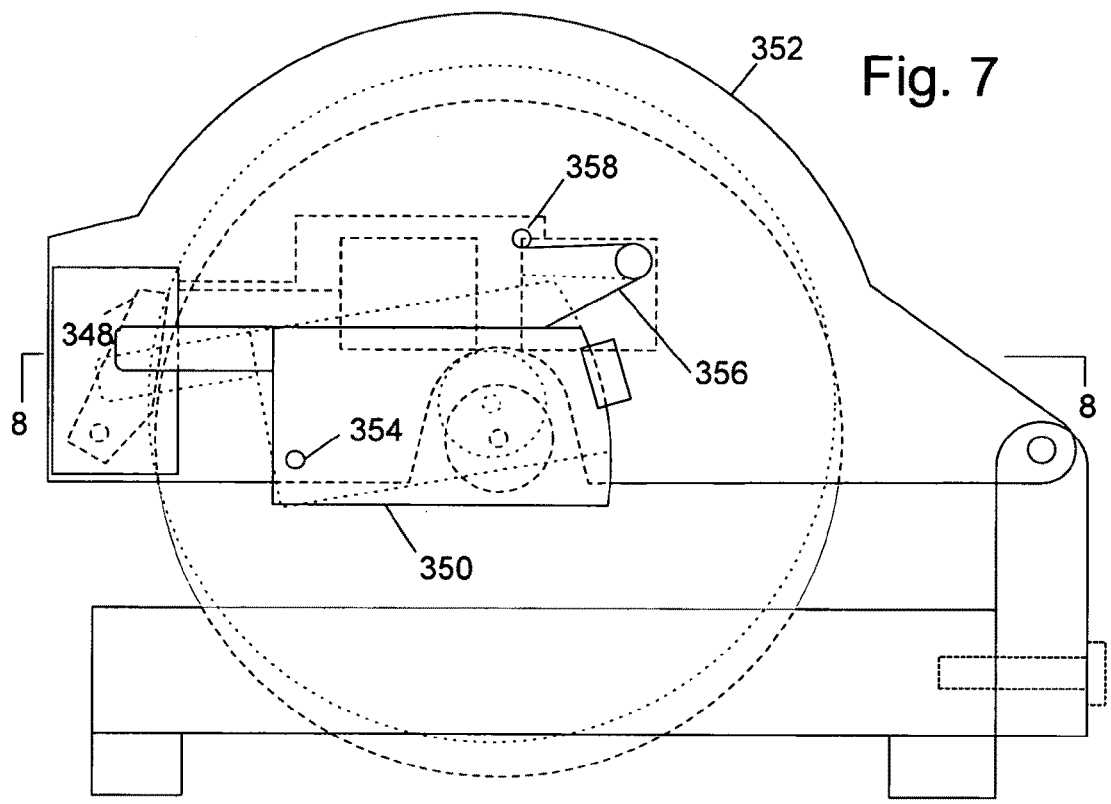
FIG. 7 is a schematic side view of a miter saw with a retraction system.
Figure 8:
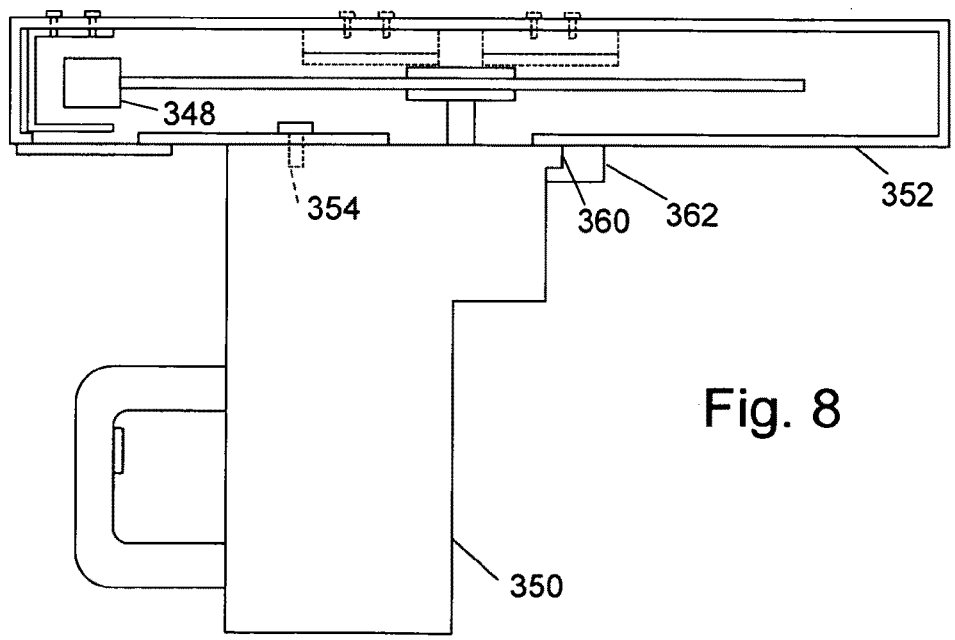
FIG. 8 is a section view of the miter saw shown in FIG. 7.

FIGS. 7 and 8 show a miter saw equipped with both a brake and a retraction system. The miter saw is configured with a pivotal motor assembly to allow the blade to move upward into the housing upon engagement with a brake pawl 348. Motor assembly 350 is connected to housing 352 via pivot bolt 354, allowing the motor assembly to pivot about bolt 354 in the direction of blade rotation. A spring 356 is compressed between the motor assembly and an anchor 358 to bias the motor assembly against the direction of blade rotation. The motor assembly may include a lip 360, which slides against a flange 362 on the housing to hold the end of the motor assembly opposite the pivot bolt against the housing.

When the saw is in use, spring 356 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 354 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped. Of course, the blade and motor assembly may be configured in any of a variety of ways to at least partially absorb the angular momentum of the blade.

Figure 9:
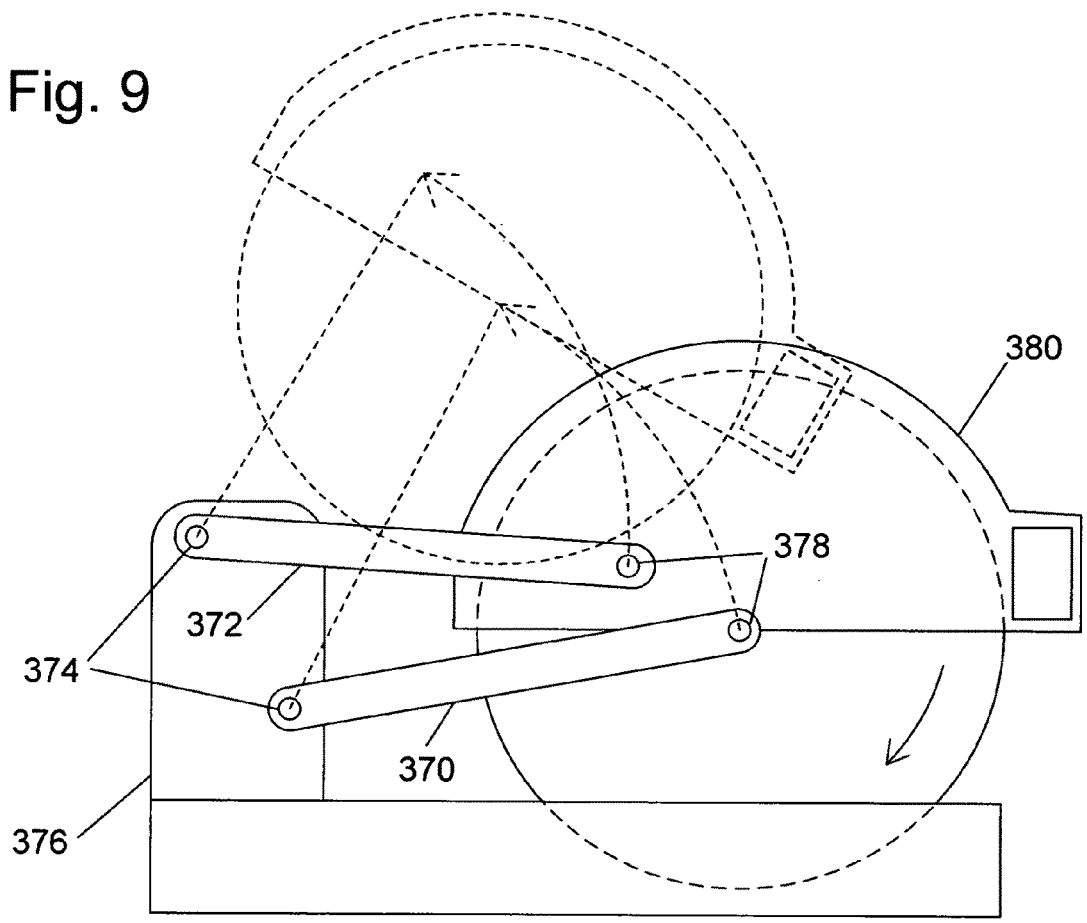
FIG. 9 shows another embodiment of a miter saw with a retraction system.

FIG. 9 shows an alternative configuration of a miter saw adapted to move away from an accidental contact with a user by absorbing the angular momentum of the blade. In this configuration, the miter saw includes two swing arms 370 and 372. One end 374 of each swing arm 370, 372 is connected to base 376, and the opposite end 378 of each swing arm is connected to housing 380, the blade, and/or the motor assembly (not shown). The position of the swing arms relative to each other may vary depending on the swing arm motion desired. In FIG. 9, swing arm 370 is connected to base 376 somewhat below and forward of swing arm 372. Typically, the motor assembly is rigidly attached to end 378 of swing arm 370, while housing 380 is connected to rotate about end 378 of swing arm 370. End 378 of swing arm 372 is connected only to the housing. Alternatively, the motor assembly may be connected to rotate about end 378 of swing arm 370 along with the housing.

The geometry of the configuration shown in FIG. 9 causes the housing and/or motor assembly to rotate as the swing arms pivot. Significantly, when the swing arms move upward, the housing and/or motor assembly rotate in the same direction in which the blade rotates during cutting. As a result, when a brake pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, the miter saw configuration illustrated in FIG. 9 is adapted to absorb the angular momentum of the blade and translate that angular momentum into an upward force on the swing arms.

Figure 10:
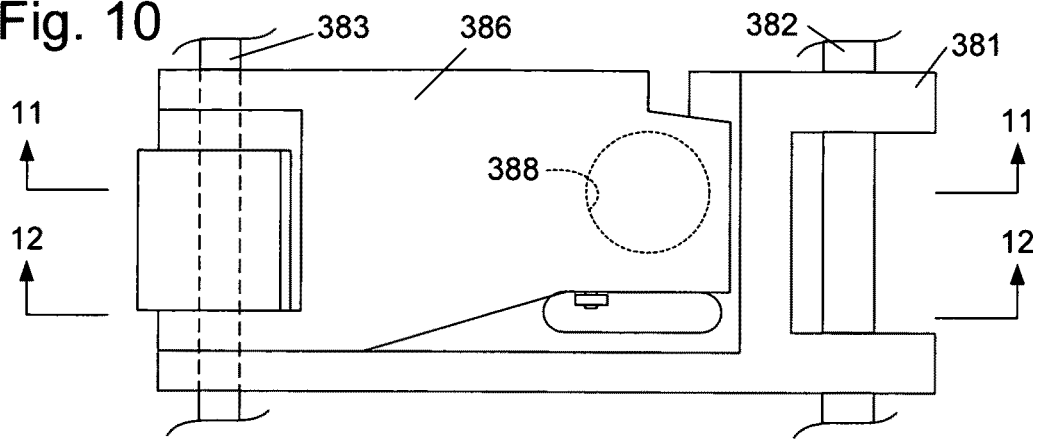
FIG. 10 shows a schematic drawing of a retraction system using a spring to retract a cutting tool.
Figure 11:
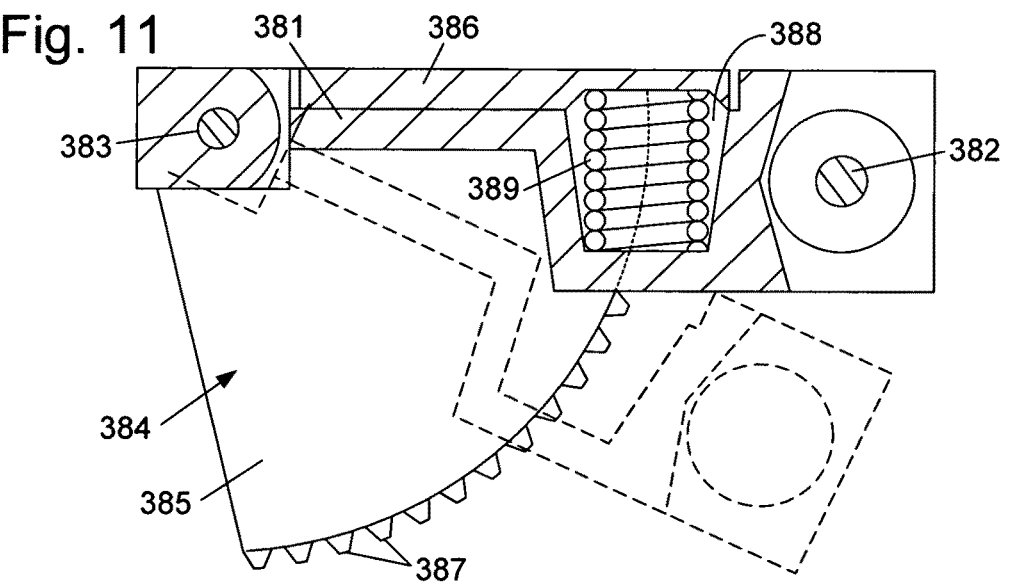
FIG. 11 is a sectional view of the retraction system shown in FIG. 10.
Figure 12:
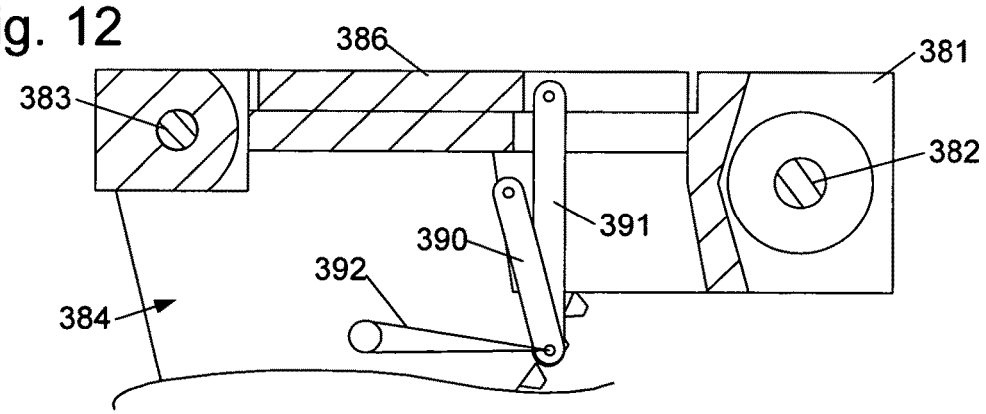
FIG. 12 also is a sectional view of the retraction system shown in FIG. 10.

In any of the systems described above, a spring or other force can be used to push the blade away from the point of contact with the user. The spring could be released by a mechanism similar to the mechanism that releases the pawl to strike the blade. FIGS. 10-12 show how a spring may be used to retract a blade in a table saw. FIG. 10 is a top view and FIGS. 11 and 12 are side views of an arbor block 381 holding an arbor 382 used to drive a blade (not shown). Arbor block 381 is pivotally mounted to pin 383 so that the arbor block and blade may pivot up and down to adjust the position of the blade in the saw.

A segment gear 384, like rack 310 described above in connection with FIGS. 3 and 4, is also mounted on pin 383, and is connected to arbor block 381 in the manner described below, to raise and lower the arbor. Segment gear 384 includes a side portion 385 positioned substantially perpendicularly to the plane of arbor block 381, and a top portion 386 positioned over arbor block 381. The side portion 385 includes gear teeth 387 to engage a worm gear to raise and lower the arbor block. Side portion 385 and top portion 386 are connected to each other and move together. Top portion 386 extends over the top of the entire arbor block, as shown. The arbor block is constructed with a region to accommodate top portion 386 so that top portion 386 does not extend substantially above the arbor block, which could limit the ability of the arbor block and blade to pivot upward when desired, such as by contacting the underside of a table in a table saw.

A pocket 388 is formed in arbor block 381 to house a spring 389. In the position shown in FIG. 11, spring 389 is compressed between top portion 386 of segment gear 384 and arbor block 381 because the segment gear and arbor block are coupled together.

The segment gear and arbor block are coupled by a compound linkage having, as shown in FIG. 12, a first arm 390 attached at one end to the arbor block and at its other end to a second arm 391. The second arm, in turn, is attached to top portion 386 of segment gear 384, as shown. First and second arms 390 and 391 are hingedly connected to each other, and to the arbor block and segment gear. The arms are configured so that the force of the spring pushing apart the arbor block and the top portion of the segment gear biases the first and second arms in such a way that the arms want to move. A fusible member 392, which may take the form of a wire as described above, restrains the arms from movement. Of course, numerous different linkages may be used, and numerous types and configurations of fusible members or other release mechanisms may be used. The linkage may be selected to provide a sufficient mechanical advantage so that the arbor block and top portion of the segment gear may be held together with as thin a fusible member as possible, so that the fusible member may be burned as easily as possible. Various analogous compound linkages are described in U.S. Provisional Patent Application Ser. No. 60/225,170, entitled "Spring-Biased Brake Mechanism for Power Equipment," filed Aug. 14, 2000. The fusible member may be burned by a system as described above, or as described in more detail in U.S. Provisional Patent Application Ser. No. 60/225,056, entitled "Firing Subsystem for Use in Fast-Acting Safety System," filed Aug. 14, 2000, the disclosure of which is hereby incorporated by reference. The compound linkage and the fusible member are preferably configured so that they accommodate spring forces of 100 to 500 pounds or more. In other embodiments, the restraining member may include various mechanical linkages, or may be part of various actuators, and those linkages and/or actuators may be released or fired by solenoids, gas cylinders, electromagnets, and/or explosives, as explained in U.S. Provisional Patent Application Ser. No. 60/302,916, entitled "Actuators for Use in Fast-Acting Safety Systems," filed Jul. 3, 2001, the disclosure of which is hereby incorporated by reference.

When the fusible member is burned, the compound linkage is free to move, and the spring pushes arbor block 381 down, away from top portion 386 of the segment gear, as shown by the dashed lines in FIG. 11, thereby retracting the blade. The stronger the spring, the faster the blade will be retracted. The segment gear does not move because it is coupled through teeth 387 to a worm gear or some other structure.

Retracting a blade by a spring or some other force may be thought of as direct retraction.

A spring or other force may be used with some other retraction system to increase the speed that a cutting tool retracts, or a spring or other force may be used as the sole means of retraction. The systems for direct retraction described above may be used on various pieces of equipment, including table saws, miter saws and band saws.

Figure 13:
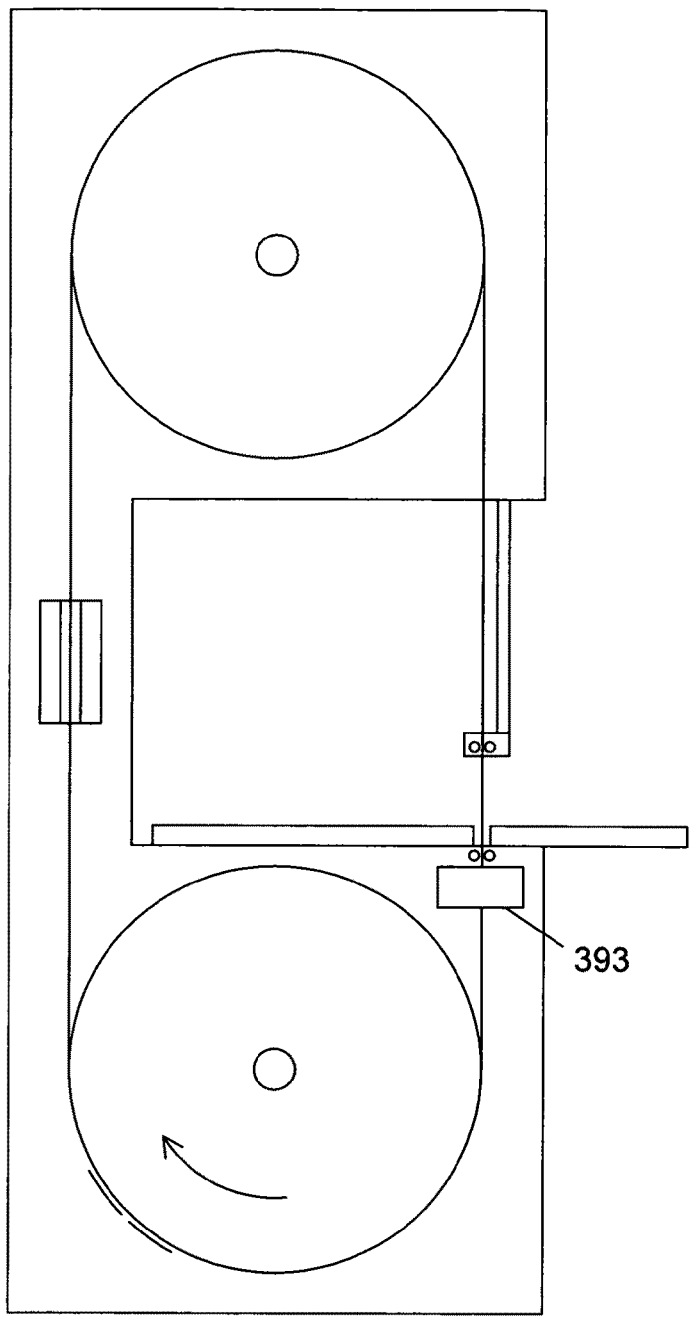
FIG. 13 is a schematic view of a band saw with a retraction system.

FIG. 13 is a schematic diagram of a system to retract the blade of a band saw. Typically, a band saw includes a main housing enclosing a pair of vertically spaced-apart wheels. The perimeter of each wheel is coated or covered in a high-friction material such as rubber, etc. A relatively thin, continuous loop blade tightly encircles both wheels. A workpiece is cut by passing it toward the blade in a cutting zone between the wheels. The workpiece is passed toward the blade on a table, which forms the bottom of the cutting zone.

Figure 14:
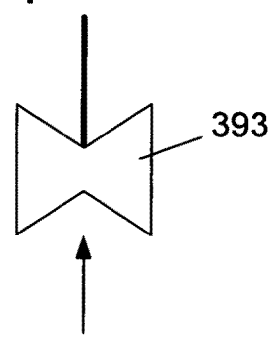
FIG. 14 is a top view of a roller used in the system shown in FIG. 13.

The band saw shown in FIG. 13 includes roller 393 positioned adjacent the blade. The roller is configured to contact the blade and push the blade away from the point of accidental contact with a user. In addition, the roller may be configured to push the blade off the wheels, thereby stopping the motion of the blade. A top view of the roller is shown in FIG. 14 pushing against a blade in the direction of the arrow. The roller may be part of a cartridge, and may be released into the blade just as the pawls described above are released. The roller should have a diameter large enough so that the roller can roll over the teeth of the blade.

The systems for direct retraction of a cutting tool may also be implemented on hand-held circular saws. Such saws typically include a base plate that contacts a workpiece during sawing. The base plate supports the saw on the workpiece. The base plate may be configured so that it is pushed down when the blade contacts a user. The result of that action is to effectively retract the blade because the base plate would push the user away from the blade.

Figure 16:
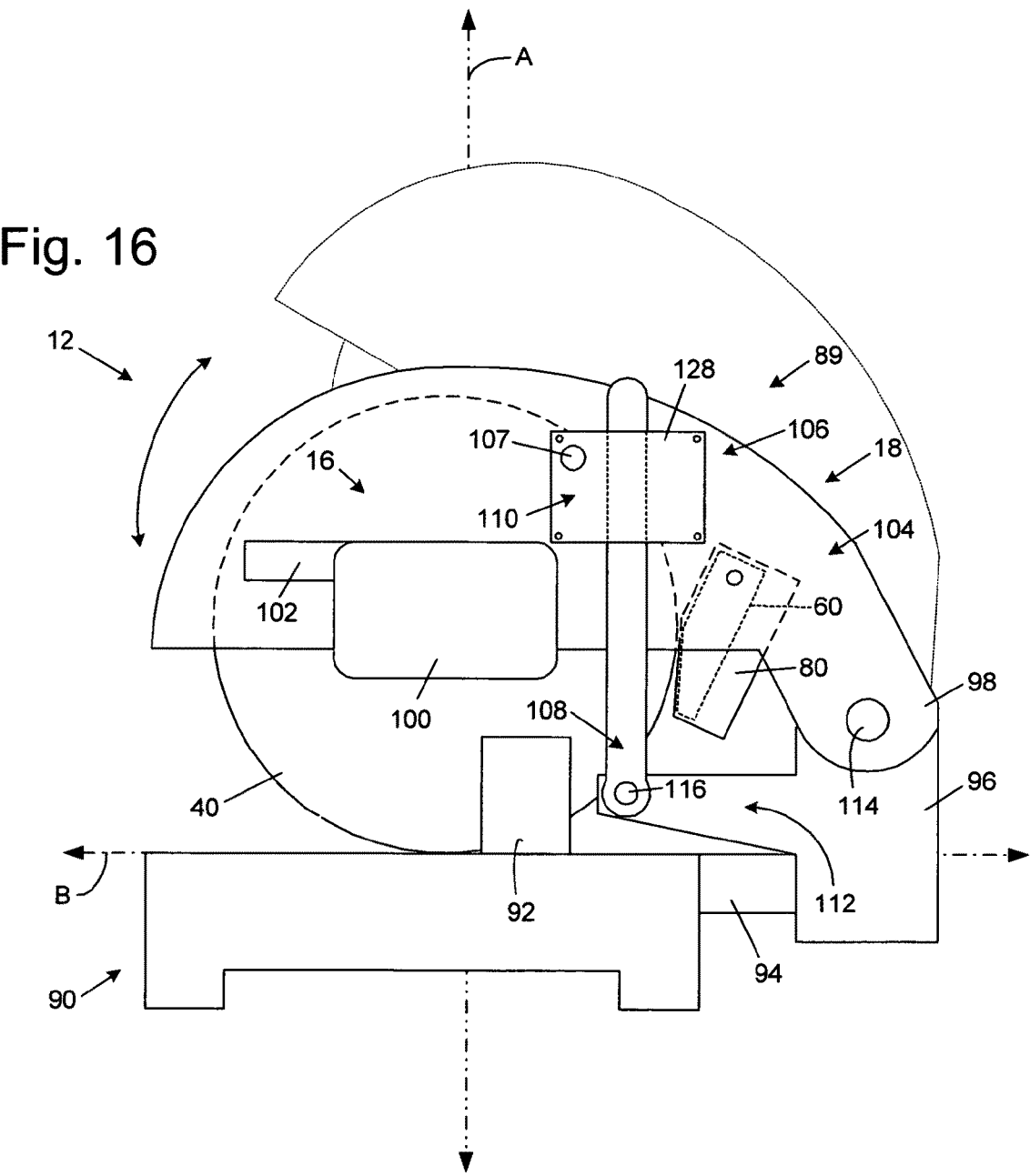
FIG. 16 is a schematic side elevation view of a miter saw having an alternative exemplary safety system configured to stop the miter saw pivot arm as well as the blade.

FIG. 16 illustrates an exemplary miter saw 89 having an alternative embodiment of safety system 18 configured to at least partially retract the pivot arm in the event of contact between the blade and the user's body.

Exemplary miter saw 89 includes a base assembly 90 adapted to support a workpiece (not shown) during cutting. Typically, one or more fences 92 are mounted on base assembly 90 and adapted to prevent the workpiece from shifting across the base assembly during cutting. Operative structure 12 is coupled to base assembly 90 and includes a platen 94, a tilt mechanism 96, and a pivot arm 98. Platen 94 is coupled to base assembly 90 and rotatable, relative to the base assembly, about the axis indicated at A. Tilt mechanism 96 is coupled to platen 94. At least a portion of the tilt mechanism is rotatable, relative to base assembly 90, about the axis indicated at B. Pivot arm 98 is coupled to tilt mechanism 96 and selectively pivotal toward and away from base assembly 90, as illustrated in FIG. 16. Typically, the pivot arm is biased upward away from base assembly 90 by a spring or other suitable mechanism.

Motor assembly 16 is mounted on pivot arm 98 and includes at least one motor 100 and a control handle 102. Blade 40 is coupled to an arbor shaft (not shown) that is rotatably driven by motor 100. Control handle 102 includes one or more controls (not shown) that are operable by a user to control motor 100. A user brings blade 40 into contact with a workpiece by grasping control handle 102 and pulling pivot arm 98 downward against the upward bias from a nominal position (indicated generally by dash lines in FIG. 16), toward base assembly 90. Once the cutting operation is completed, the user allows the pivot arm to pivot upward toward the nominal position.

It will be appreciated by those of skill in the art that the miter saw configuration depicted in FIG. 16 and described above is one commonly referred to as a "compound miter saw," which allows a user to make a compound (i.e., both mitered and beveled) cut in a workpiece by adjusting the position of platen 94 and/or tilt mechanism 96. However, there are many other miter saw configurations known to those of skill in the art which are also suitable for use with the present invention. Thus, it will be understood that the particular miter saw configurations depicted and described herein are provided to illustrate exemplary embodiments of the invention, and should not be interpreted to limit the scope or application of the present invention.

Although not shown in FIG. 16, detection subsystem 22 and control subsystem 26 may be mounted at any desired location on miter saw 89 and configured to detect contact between blade 40 and a user's body as described above and in the references incorporated herein. Alternatively, the detection and control subsystems may be configured to detect contact between the user's body and some other portion of the miter saw such as a guard, etc. Upon receiving an activation signal, a first portion 104 of reaction subsystem 24 is configured to stop the rotation of blade 40, while a second portion 106 of the reaction subsystem is configured to move pivot arm 98 upward away from the base assembly. In the exemplary embodiment, first portion 104 includes a brake pawl 60 mounted in a cartridge 80, such as described above and in the incorporated references. Brake pawl 60 is selectively pivotal into blade 40 to stop the rotation of the blade. Alternatively, the first portion may employ other brake mechanisms such as described in the incorporated references. As a further alternative, first portion 104 may be omitted so that the rotation of blade 40 is not stopped in response to the occurrence of a dangerous condition.

In any event, second portion 106 retracts the pivot arm upward far enough to remove the blade from contact with the user's body. Preferably, the second portion is configured to move the pivot arm upward at least ⅛-inch, more preferably at least ¼-inch, and most preferably at least ½-inch or more. In embodiments where the reaction subsystem is configured to stop the rotation of blade 40, the second portion preferably retracts the pivot arm before or at the same time the blade is stopped. This prevents the pivot arm from moving downward as a result of angular momentum transferred to the pivot arm from the blade. The second portion of the reaction subsystem may be triggered prior to the first portion, or the second portion may be configured to engage the pivot arm more quickly than the brake pawl engages the blade.

Second portion 106 of exemplary reaction subsystem 24 includes a brace member 108 and a retraction assembly 110. Brace member 108 is pivotally coupled to tilt mechanism 96 at 105. Retraction assembly 110 is pivotally coupled to pivot arm 98 at 107 and configured to slidably receive at least a portion of brace member 108. The retraction assembly is configured to quickly grip or lock onto the brace member and urge the pivot arm upward upon receipt of an actuation signal from control subsystem 26. Once the retraction assembly has been triggered, pivot arm 98 is prevented from further downward movement toward base assembly 90. While second portion 106 is illustrated as having a single brace member and a single retraction assembly on one side of miter saw 89, it will be appreciated that the reaction subsystem may alternatively include a plurality of brace members and/or retraction assemblies positioned at selected locations on miter saw 89.

Brace member 108 may take any of a variety of different forms. In the exemplary embodiment, the brace member is an elongate bar or shaft pivotally coupled to tilt mechanism 96. Brace member 108 may be constructed of any suitably rigid material such as steel, aluminum, plastic, ceramic, etc. The pivotal coupling between the brace member and the tilt mechanism allows the brace member to pivot as necessary to follow the retraction assembly as the pivot arm moves toward and away from the base assembly. In the exemplary embodiment, the brace member is coupled to the tilt mechanism by a ball-joint-rod-end-bearing coupling 105, such as are available from a variety of sources including MSC Industrial Supply Company of Melville, N.Y. Alternatively, other types of couplings may be used, such as universal couplings, etc.

In the exemplary embodiment, brace member 108 is coupled to an arm portion 112 of tilt mechanism 96 that extends outward from the tilt mechanism toward the base assembly. While arm 112 is depicted as an integral, unitary portion of the tilt mechanism, the arm portion may alternatively take the form of a separate bracket attached to the tilt mechanism. Alternatively, the arm may be omitted and brace member 108 may be coupled to another portion of the tilt mechanism. As further alternatives, the brace member may be coupled to a different portion of miter saw 10 such as platen 94, fence 92, or base assembly 90, etc. In any event, the brace member should be relatively rigidly supported to ensure that pivot arm 98 is moved upward when retraction assembly 110 is triggered.

Retraction assembly 110 may be coupled to pivot arm 98 in any of a variety of different places. Typically, the retraction assembly and pivot point 107 are disposed to position brace member 108 spaced apart from pivot point 114 of arm 98 to increase the moment of the upward force applied by reaction subsystem 24 to pivot arm 98. It will be appreciated that the further brace member 108 is positioned from pivot point 114, the greater the moment of force provided by the retraction assembly. Thus, it is generally desirable, though not necessary, to position the brace member as close to the front of miter saw 89 (i.e., the left side as shown in FIG. 16) as possible without interfering with the use of the miter saw. Similarly, the pivot point 105 of the brace member is disposed, relative to the retraction assembly, to orient the brace member generally perpendicular to the direction in which the pivot arm moves. This arrangement ensures that the downward force on the brace member is substantially a compression force rather than torque. Alternatively, retraction assembly 110 and pivot point 105 may be disposed at any selected positions suitable for stopping downward movement of pivot arm 98.

Since brace member 108 is coupled to tilt mechanism 96, the brace member will rotate along with pivot arm 98 about axis A when the miter saw is adjusted for mitered cuts. Similarly, the brace member will tilt about axis B when the miter saw is adjusted for beveled cuts. Thus, the exemplary configuration of reaction subsystem 24 depicted in FIG. 16 allows a user to adjust miter saw 89 throughout its full range of movement.

Optionally, reaction subsystem 24 may include one or more positioning mechanisms configured to remove any play or looseness in the couplings between brace member 108 and tilt mechanism 96, and/or the couplings between retraction assembly 110 and pivot arm 98. In situations where play or looseness may be present, the positioning mechanism ensures that the brace member and retraction assembly do not shift when the reaction subsystem is triggered.

Turning attention now to FIGS. 17-21, one exemplary embodiment of retraction assembly 110 is illustrated. Exemplary retraction assembly 110 is configured to grip and push downward on brace member 108 to move pivot arm 98 upward in response to an activation signal from control subsystem 26. Retraction assembly 110 includes a housing 118 configured to slidably receive brace member 108. Housing 118 includes a lower wall 120, and an upper wall 122 spaced apart from the lower wall. Housing 118 also includes a first end wall 124 and a second end wall 126 extending between opposite ends of lower wall 120 and upper wall 122. The lower, upper and end walls are connected together by any suitable mechanism such as bolts 127. A pair of side walls 128 (shown in FIG. 16) cover the sides of the lower, upper and end walls to enclose the housing.

Housing 118 is connected to the side of pivot arm 98 by a pivotal coupling 107 that allows the housing to move relative to the pivot arm as needed. Any of a variety of different couplings may be used which are known to those of skill in the art, such as a shoulder screw, etc. The pivotal coupling allows housing 118 to move as necessary to maintain a constant orientation or alignment with the brace member. In embodiments where the brace member is connected to a different structure on miter saw 89 such as platen 94 or fence 92, coupling 107 may be configured to allow the housing to both pivot parallel to the side of the pivot arm and tilt away from the pivot arm as needed.

As mentioned above, housing 118 is configured to slide along brace member 108. Lower wall portion 120 includes an orifice 130 configured to slide over the brace member. Similarly, upper wall portion 122 includes an orifice 132 configured to slide over the brace member. Orifices 130 and 132 are generally axially aligned and sized to closely fit around the brace member, thereby maintaining the housing in a uniform orientation relative to the brace member as pivot arm 98 is moved toward and away from the workpiece.

Figure 17:
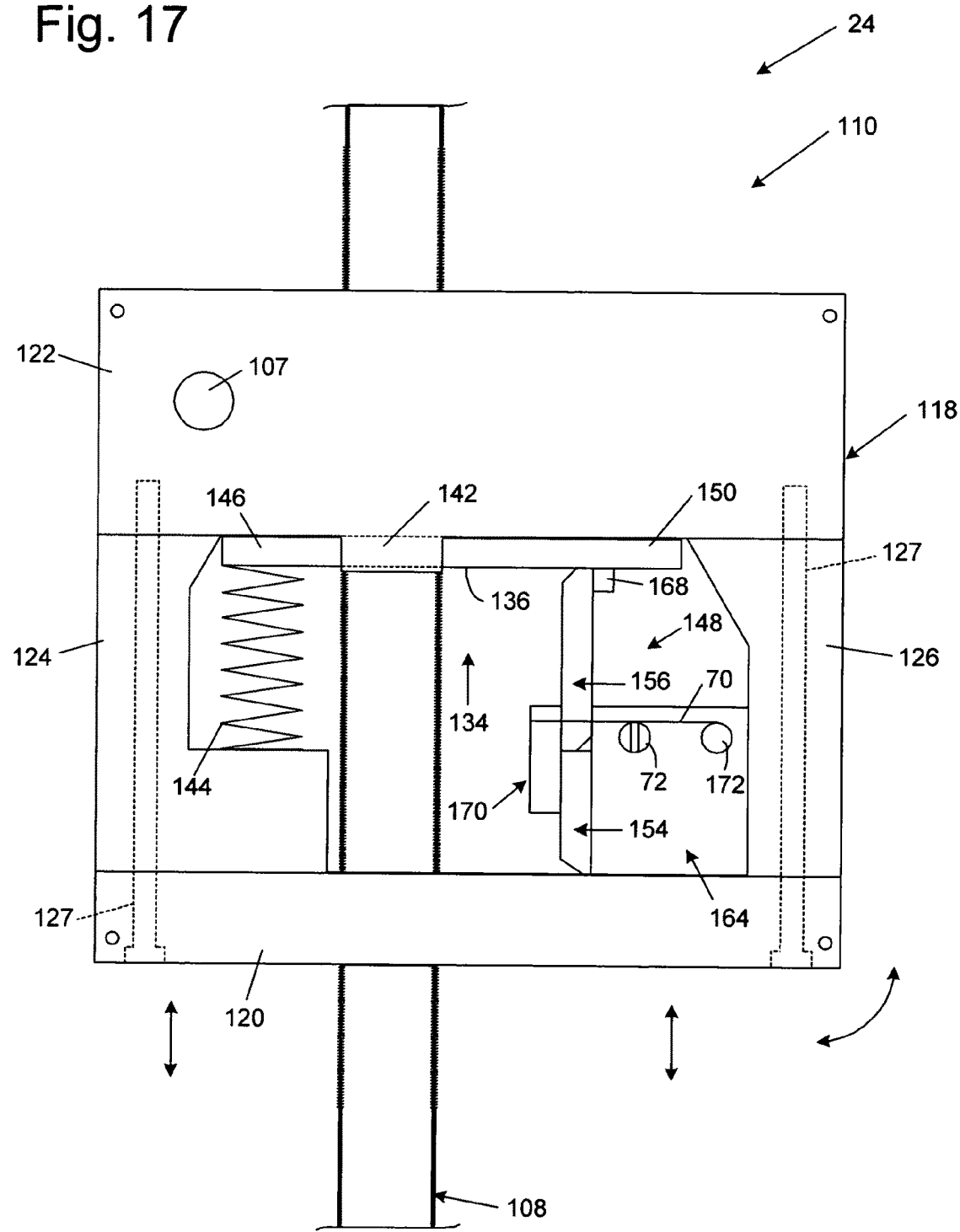
FIG. 17 is a magnified side view of an exemplary retraction assembly according to the present invention.
Figure 18:
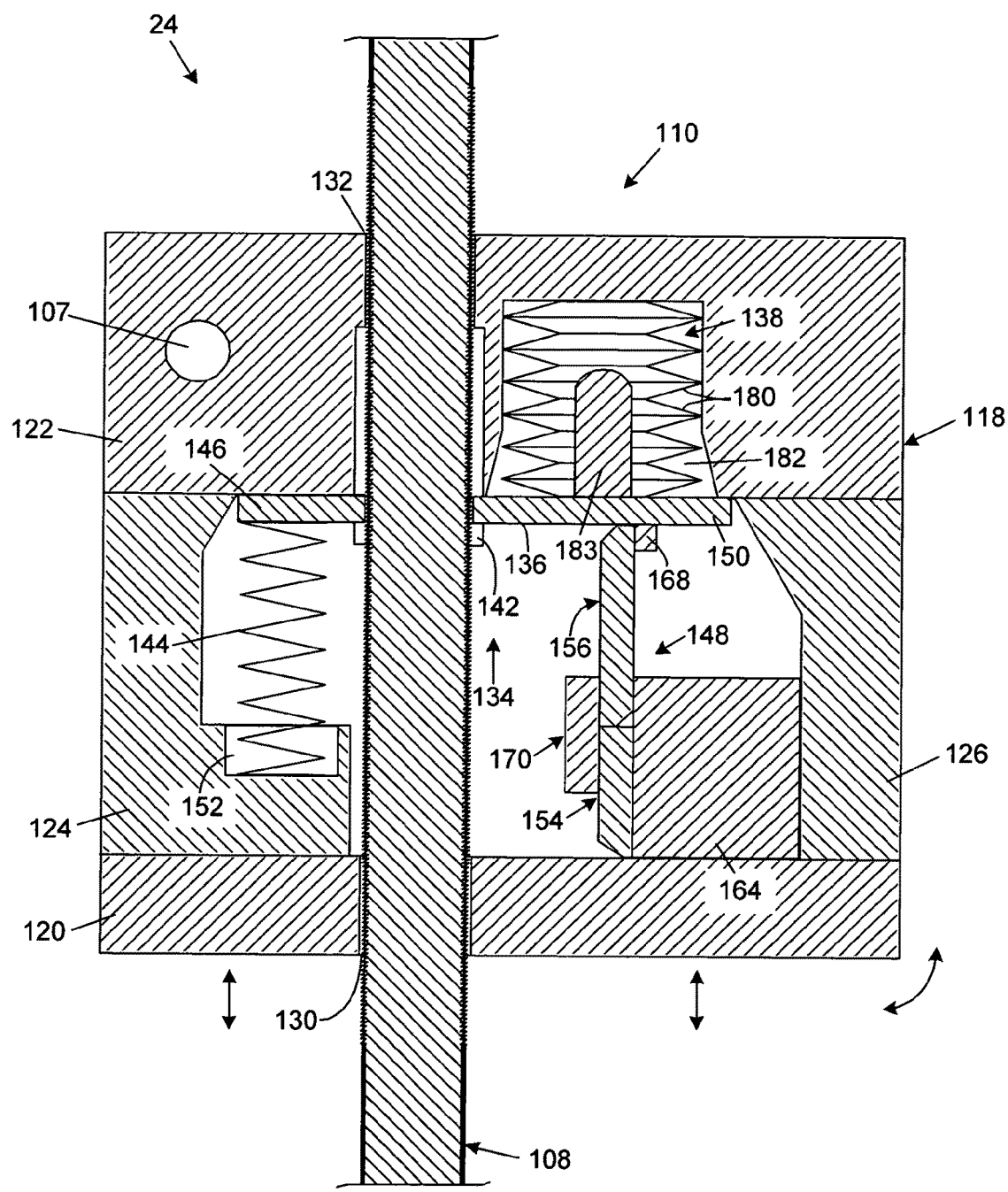
FIG. 18 is a magnified cross-sectional view of the retraction assembly of FIG. 17.
Figure 20:
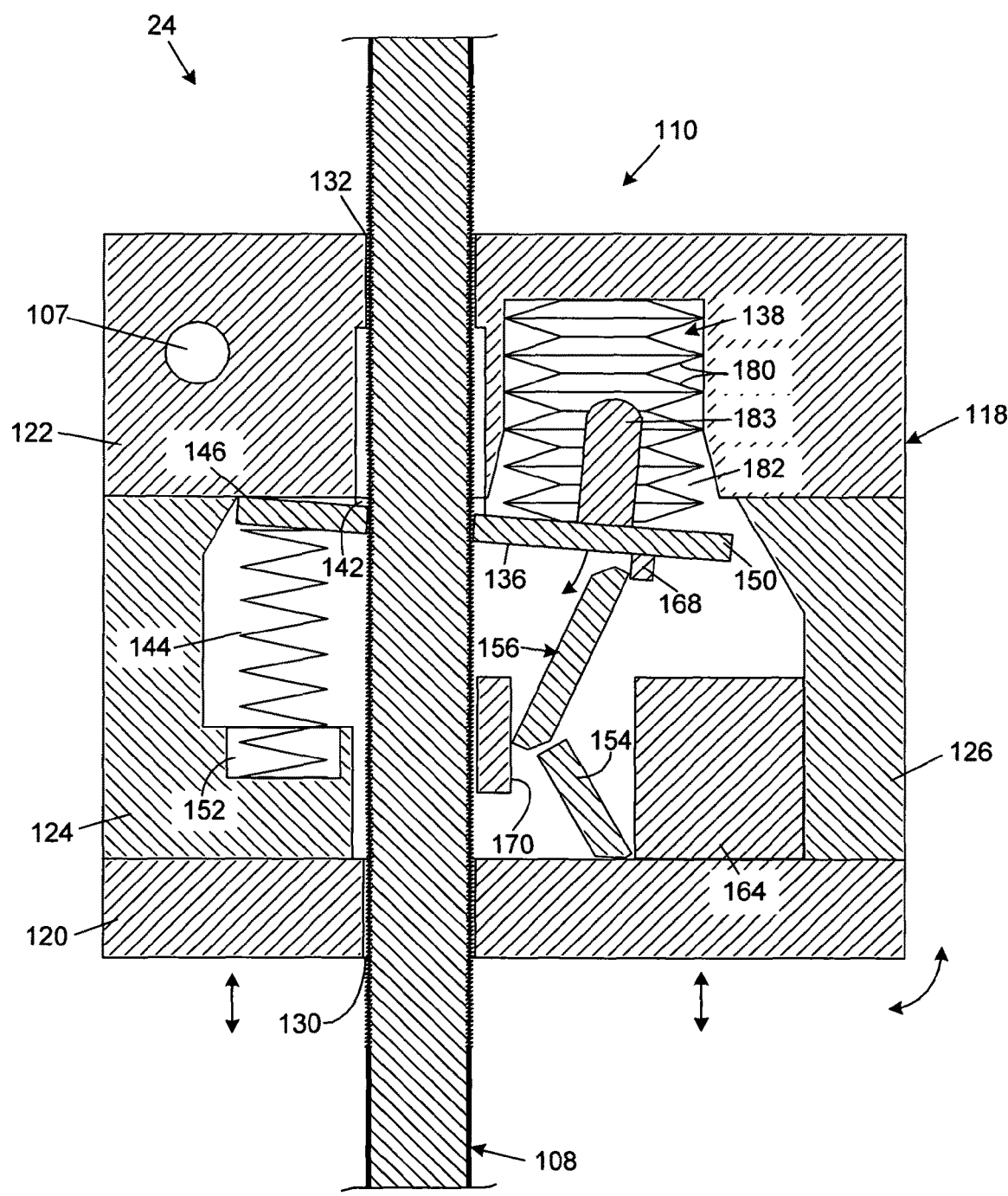
FIG. 20 is similar to FIG. 18 except that the clamping device is shown pivoted to the locked position.

Retraction assembly 110 also includes an actuator 134 configured to selectively grip brace member 108 and push the housing upward. Actuator 134 may be any one or a combination of elements, devices or mechanisms configured to quickly and securely grip the brace member. In the exemplary embodiment, actuator 134 includes a clamping device 136 adapted to selectively grip the brace member, and a drive mechanism 138 adapted to urge the housing upward relative to the clamping device. Clamping device 136 is formed to define an orifice 140 adapted to closely fit and slide along the brace member. The clamping device is pivotal between a nominal or unactuated position (as shown in FIGS. 17 and 18), and an actuated or locked position (as shown in FIG. 20). When the clamping device is in the nominal position, the sides of orifice 140 are substantially aligned with the sides of brace member 108 so that the clamping device slides relatively freely along the brace member. Conversely, when the clamping device is pivoted into the locked or actuated position, the sides of orifice 140 press into and bind against the brace member to releasably lock the clamping device onto the brace member. Drive mechanism 138 is disposed between the clamping device and upper wall 122 and configured to push the upper wall away from the clamping device when the clamping device is in the locked position. As a result, housing 118 and pivot arm 98 are pushed upward relative to the brace member and base assembly 90.

Clamping device 136 may be constructed of any suitable material adapted to grip the brace member and support the force exerted by drive mechanism 138. Typically, the clamping device is constructed of a material which does not cause damage to brace member 108 when the retraction assembly is triggered. For example, the clamping device and brace member may each be formed from a relatively rigid material such as hardened steel. Alternatively, the clamping device and/or brace member may be formed of any of a variety of other suitable materials known to those of skill in the art.

When in the nominal position, clamping device 136 is disposed adjacent the lower surface of upper wall 122 between end walls 124 and 126. The end walls are spaced to align the clamping device and orifice 140 end-to-end with the upper wall and orifice 132. Each end wall is inwardly tapered adjacent the upper wall so as not to obstruct the movement of the clamping device. Upper wall 122 includes a pair of alignment structures 142 adapted to align the clamping device and orifice 140 side-to-side with the upper wall and orifice 132. When clamping device 136 is in the nominal position, orifice 140 is generally axially aligned with orifice 132 and orifice 130 to slidably receive the brace member.

Clamping device 136 is held in the nominal position by a yieldable support element such as spring 144 that engages the clamping device adjacent a first end 146, as well as a releasable restraining mechanism 148 that engages the clamping device adjacent a second end 150. First end wall 124 includes a recessed region adapted to hold a portion of spring 144 and align the spring with the clamping device. Although spring 144 is depicted as a compression spring, it will be appreciated that spring 144 may be any type of spring or other mechanism adapted to yieldably hold first end 146 adjacent the lower surface of upper wall 122.

Restraining mechanism 148 may take any of a variety of different configurations adapted to releasably support second end 150 of the clamping device. In the exemplary embodiment, drive mechanism 138 (which will be discussed in more detail below) exerts a constant downward force on the clamping device adjacent second end 150. Restraining mechanism 148 is configured to support the clamping device against the force exerted by the drive mechanism. Typically, though not necessarily, the restraining mechanism is generally aligned with the drive mechanism to reduce any bending stress to the clamping device.

Figure 21:
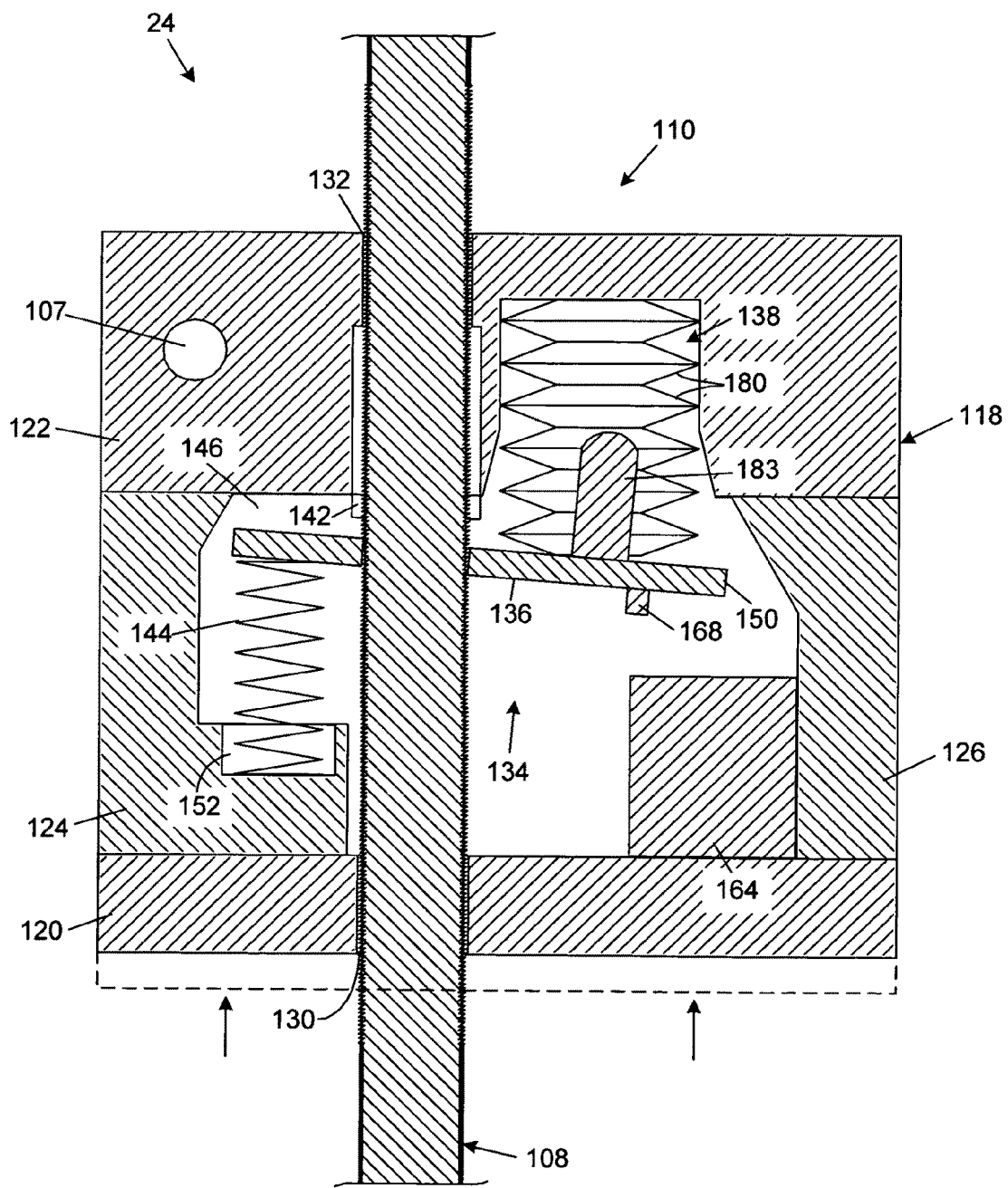
FIG. 21 is similar to FIG. 20 except that the housing is shown pushed upward relative to the brace member. For clarity, the components of the restraining member are not shown.

Exemplary restraining mechanism 148 is selectively collapsible to release the second end of the clamping device. The restraining mechanism includes an elongate collapsible base 154 adapted to support an elongate brace 156. In its uncollapsed state illustrated in FIGS. 17-19, a lower end 158 of base 154 rests on the upper surface of lower wall 120. The base extends upward from the lower wall toward the clamping device. A lower end 160 of brace 156 rests on an upper end 162 of base 154. The brace extends upward from the base to support the clamping device. When the base collapses, the brace is dislodged, thereby releasing the clamping device as shown in FIGS. 20-21.

When in the uncollapsed, upright position, one side of base 154 is disposed against a buttress structure 164. One side of lower end 160 of the brace is also disposed against the buttress structure, while an upper end 166 of the brace is disposed against a shoulder structure 168 on the clamping device. Shoulder structure 168 is configured to position the brace in upright alignment on top of the base. Base 154 and brace 156 are clamped against the buttress structure by a stabilizer member 170. The stabilizer member is held in clamping engagement with the base and the brace by a fusible member 70 such as described above and in the incorporated references. Fusible member 70 extends from the stabilizer member, over a contact mount 72 to an anchor point 172. Contact mount 72 is coupled to a firing subsystem (not shown) adapted to supply sufficient electrical current to melt the fusible member. In the exemplary embodiment, contact mount 72 is anchored to buttress structure 164, which is constructed of an electrically non-conducting material such as plastic, etc.

Figure 19:
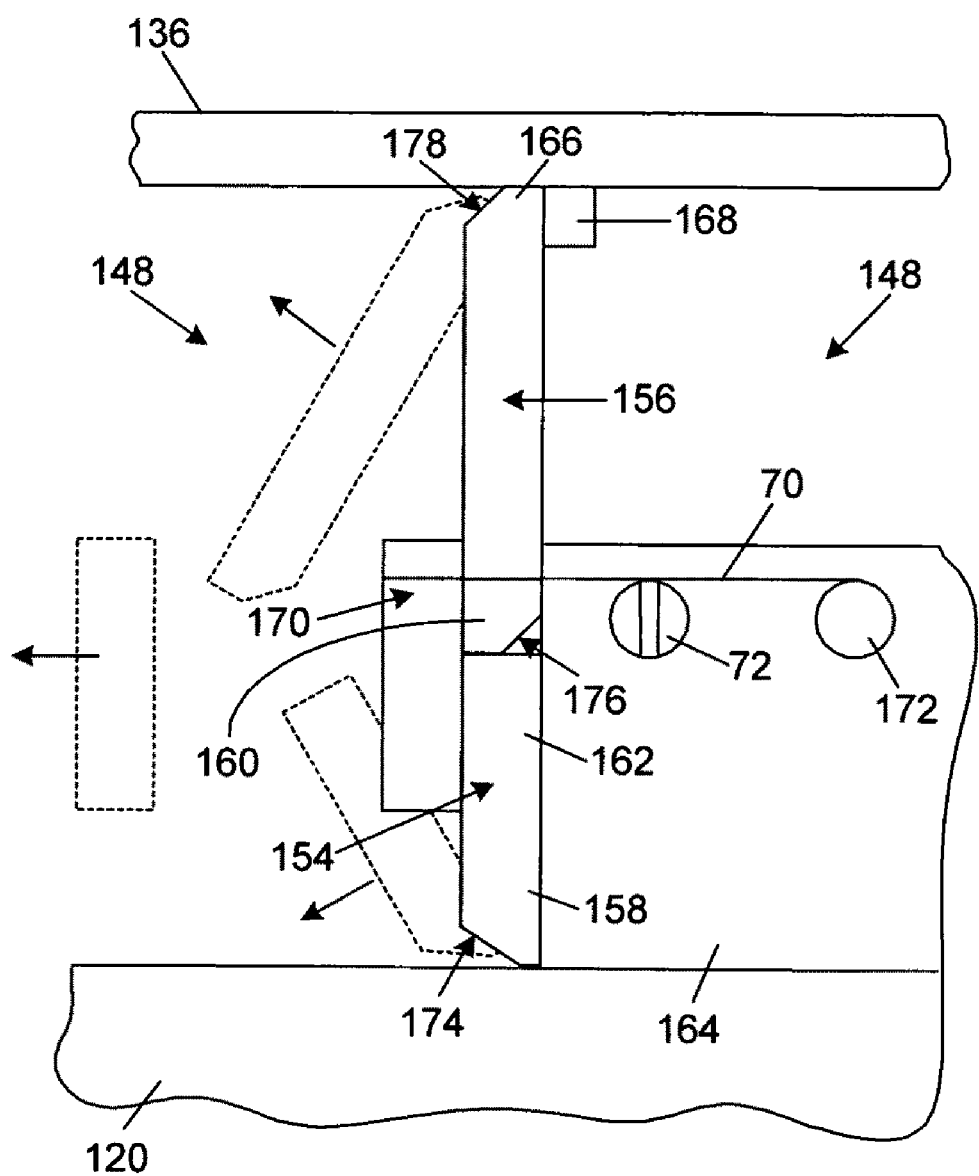
FIG. 19 is a magnified, fragmentary view of the retraction assembly of FIG. 17, showing the restraining mechanism in detail.

Lower end 158 of the base includes a beveled region 174 opposite the buttress structure. As shown in FIG. 19, beveled region 174 extends through more than half the thickness of the base. Lower end 160 of the brace includes a beveled region 176 adjacent the buttress structure. As a result, a portion of the downward pressure exerted on the clamping device by the drive mechanism is translated onto upper end 162 as a pivoting force away from the buttress structure. The remainder of the downward force is translated into a downward force on lower wall 128. The upper end of the base is prevented from pivoting outward so long as stabilizer structure 170 remains in place.

Those of skill in the art will appreciate that the particular configuration of restraining mechanism 148 described above provides a mechanical advantage for supporting second end 150 of the clamping device under the downward force of the drive mechanism. The proportion of downward force translated into pivoting force on the base will vary with the depth of beveled regions 174 and 176. Beveled regions 174 and 176 typically are configured so that much of the downward force applied by the drive mechanism is translated into downward force on base 154 rather than pivoting force. As a result, fusible member 70 is only required to support a portion of the force exerted by the drive mechanism. Indeed, several hundred pounds of downward force may be translated into only 10-20 pounds of outward pivoting force on stabilizer structure 170. This allows the fusible member to have a smaller diameter, thereby requiring less energy to melt. Nevertheless, the outward pivoting force should be sufficient to ensure the base collapses within 5-10 milliseconds, and preferably within 1-5 milliseconds.

In any event, when stabilizer member 170 is released, the upper end of base 154 quickly pivots outward from the buttress structure and collapses beneath the brace, as illustrated in FIGS. 19 and 20. Upper end 166 of the brace includes a beveled region 178 opposite shoulder structure 168 to allow the lower end of the brace to freely pivot outward from the buttress structure along with the base. Second end 150 of the clamping device is thereby released to move downward under the urging of the drive mechanism.

While second end 150 of the clamping device is pushed downward by the drive mechanism, first end 146 is pushed upward by spring 144. As a result, clamping device 136 pivots about brace member 108 into the locked position where the edges of orifice 140 bind against the sides of the brace member as shown in FIG. 20. The angle through which the clamping device must pivot before binding against the brace member will vary based at least partially on the size differential between orifice 140 and brace member 108. It is believed that the binding force generated by the clamping device against the brace member is increased where the pivot angle between the nominal position and the locked position is relatively small. Therefore, orifice 140 typically is sized to fit relatively closely around the brace member. For example, in an embodiment where brace member 108 takes the form of a rod having a circular cross-section with a diameter of approximately 0.375-inch, one suitable diameter for orifice 140 would be approximately 0.376-inch. Alternatively, other diameters may also be used within the scope of the invention. For clarity, the size difference between orifice 140 and brace member 108 is shown substantially exaggerated in FIGS. 18, 20 and 21.

As mentioned above, drive mechanism 138 is disposed between upper wall 122 and second end 150 of the clamping device. The drive mechanism is configured to urge the second end and upper wall apart when the clamping device is released from restraining mechanism 148. Once clamping device 136 pivots to the locked position, further downward movement of second end 150 is prevented because the clamping device is locked against the brace member. As a result, the additional drive force exerted by the drive mechanism forces upper wall 122 and housing 118 upward relative to the clamping device and brace member, as illustrated in FIG. 21. Since the housing is coupled to pivot arm 98, the pivot arm is forced upward as well.

Drive mechanism 138 should be configured to overcome the downward momentum of the pivot arm as well as any transferred angular momentum caused by stopping blade 40. In addition, the upward force exerted by the drive mechanism on the housing should be substantially larger than any downward force exerted by spring 144. Typically, the drive mechanism is configured to provide 100-500 pounds of upward force on the pivot arm. The length of upward travel of the pivot arm will depend on the length of translation, or 'throw,' of the drive mechanism as well as the distance second end 150 pivots downward before locking against the brace member.

In the exemplary embodiment, drive mechanism 138 includes a plurality of Belleville springs 180 stacked in series. The number of springs in the series is selected to provide a desired throw. Optionally, each spring in the series may alternatively be plural springs stacked in parallel to provide a desired amount of driving force. Springs 180 are disposed in a recessed region 182 of upper wall 122. The recessed region is sized to maintain the springs in general axial alignment. Additionally, clamping device 136 includes a spindle structure 183, adapted to fit within the central bores of at least a portion of the springs to maintain alignment between the springs. The spindle structure also serves to maintain alignment between the springs and the clamping device. It will be appreciated by those of skill in the art that drive mechanism 138 may alternatively take any of a variety of other configurations adapted to lock the clamping device against the brace member and force the pivot arm upward. For example, the drive mechanism may include a coil compression spring, explosive device, etc.

In any event, once the retraction assembly has been triggered, it may be uncoupled from the pivot arm and slid off the brace member. A new, untriggered retraction assembly may then be installed to place miter saw 89 and safety system 18 back in operation. Alternatively, the triggered retraction assembly may be reset using a new fusible member.

While one particular implementation of retraction assembly 110 has been described, it will be appreciated that numerous alterations and modifications are possible within the scope of the invention. Additionally, while the retraction assembly has been described in the context of retracting the pivot arm of a miter saw, it will be appreciated that the retraction assembly may also be adapted for use in other ways and on other machines.

Machines that include various components and features discussed above may be described as follows:

A cutting machine comprising a cutter; a brake adapted to stop the cutter, where the brake has an idle position and a braking position; and an actuation system adapted to selectively move the brake from the idle position to the braking position, where at least a portion of the actuation system must be replaced after moving the brake from the idle position to the braking position; wherein the actuation system includes an explosive device.

A cutting machine comprising a support structure; a cutting tool adapted to cut a workpiece, where the cutting tool is supported by the support structure; a detection system adapted to detect a dangerous condition between the cutting tool and a person; a reaction system adapted to perform a specified action upon detection of the dangerous condition; an explosive to trigger the reaction system to perform the specified action upon firing of the explosive; and a firing subsystem to fire the explosive upon detection of the dangerous condition.

INDUSTRIAL APPLICABILITY

The present invention is applicable to power equipment, and specifically to woodworking equipment such as table saws, miter saws, band saws, circular saws, jointers, etc. The present invention provides a safety system or reaction system wherein a cutting tool or other dangerous item is retracted upon the occurrence of a specified event, such as when accidental contact between a user and a blade is detected. Retraction of a cutting tool, for example, can minimize any injury from accidental contact with the cutting tool by reducing the amount of time the cutting tool is in contact with a user or by moving the cutting tool to a position where the user cannot contact it. A retraction system may be used in combination with other safety features to maximize the performance of an overall safety system. For example, a retraction system may be used with a system that quickly stops a cutting tool so that the cutting tool simultaneously stops and moves away from a user. A fusible member or explosive may be used to trigger the reaction system to perform the specified action. A firing subsystem may be used to fuse the fusible member or fire the explosive upon detection of the dangerous condition.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine having a cutting region for cutting workpieces, the woodworking machine comprising:
   a cutting tool configured to extend at least partially into the cutting, region;
   a detection system adapted to detect a dangerous condition between a person and the cutting tool;
   a reaction system associated with the detection system and the cutting tool, where the reaction system is configured to move the cutting tool at least partially out of the cutting region upon detection of the dangerous condition by the detection system; and
   a stop positioned to limit continued movement of the cutting tool after the cutting tool has moved out of the cutting region a predetermined amount.

2. The woodworking machine of claim 1, where the stop comprises an impact-absorbing component.

3. The woodworking machine of claim 1, further comprising an arbor block structure supporting the cutting tool, and where the stop is configured to limit the movement of the cutting tool through contact with at least a portion of the arbor block structure.

4. The woodworking machine of claim 3, where the stop includes a surface, and further comprising an impact-absorbing component on at least one of the surface or the arbor block structure.

5. The woodworking machine of claim 1, further comprising an arm supporting the cutting tool, and where the stop is configured to limit the movement of the cutting tool through contact with at least a portion of the arm.

6. A woodworking machine comprising:
   a work surface defining a cutting region;
   a cutting tool positioned to extend at least partially into the cutting region;
   a detection system adapted to detect a dangerous condition between a person and the cutting tool;
   a reaction system .associated with the detection system and the cutting tool, where the reaction system is configured to retract the cutting tool below the work surface after the dangerous condition is detected by the detection system; and
   a stop to limit the retraction of the cutting tool.

7. The woodworking machine of claim 6, where the stop comprises an impact-absorbing material.

8. The woodworking machine of claim 6, further comprising an arbor block structure supporting the cutting tool, and where the stop is configured to limit the retraction of the cutting toot through contact with at least a portion of the arbor block structure.

* * * * *

UNITED STATES PATENT AND TRADEMARK OFFICE
CERTIFICATE OF CORRECTION

| | | |
|---|---|---|
| PATENT NO. | : 8,196,499 B2 | Page 1 of 1 |
| APPLICATION NO. | : 12/806836 | |
| DATED | : June 12, 2012 | |
| INVENTOR(S) | : Stephen F. Gass | |

It is certified that error appears in the above-identified patent and that said Letters Patent is hereby corrected as shown below:

In the Claims:

In column 24, line 16, after "cutting" delete ",".

In column 24, line 48, after "a reaction system" delete ".".

In column 24, line 59, delete "toot" and insert --tool--.

Signed and Sealed this
Tenth Day of September, 2013

Teresa Stanek Rea
*Acting Director of the United States Patent and Trademark Office*